US007605548B2

(12) United States Patent
Yamashita et al.

(10) Patent No.: US 7,605,548 B2
(45) Date of Patent: Oct. 20, 2009

(54) ELECTRICITY CONTROLLER, DEVICE FOR LIGHTING DISCHARGE TUBE, DISPLAY DEVICE AND ELECTRIC POWER CONTROL METHOD

(75) Inventors: Toyomi Yamashita, Niiza (JP); Yoshikazu Kobayashi, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 380 days.

(21) Appl. No.: 11/526,985

(22) Filed: Sep. 26, 2006

(65) Prior Publication Data

US 2007/0075649 A1 Apr. 5, 2007

(30) Foreign Application Priority Data

Sep. 30, 2005 (JP) .............................. 2005-286321

(51) Int. Cl.
*H05B 37/02* (2006.01)
(52) U.S. Cl. ...................... 315/307; 315/159; 315/360
(58) Field of Classification Search ................. 315/149, 315/159, 209 R, 241 P, 247, 291, 307–309, 315/360; 345/204
See application file for complete search history.

(56) References Cited

U.S. PATENT DOCUMENTS

| 5,231,333 | A | * | 7/1993 | Orenstein .................... 315/219 |
| 6,181,075 | B1 | * | 1/2001 | Doss ........................... 315/224 |
| 6,337,543 | B1 | * | 1/2002 | Ge ............................. 315/227 R |
| 7,166,971 | B2 | * | 1/2007 | De Clercq et al. ............ 315/307 |
| 7,525,261 | B2 | * | 4/2009 | Van Zundert et al. ........ 315/307 |
| 2005/0147129 | A1 | * | 7/2005 | Maehara et al. .............. 370/486 |
| 2006/0007209 | A1 | * | 1/2006 | Nakamura et al. ........... 345/204 |
| 2006/0114215 | A1 | * | 6/2006 | Lee et al. ....................... 345/98 |
| 2006/0279230 | A1 | * | 12/2006 | Lee et al. ..................... 315/247 |

* cited by examiner

*Primary Examiner*—David Hung Vu
*Assistant Examiner*—Tung X Le
(74) *Attorney, Agent, or Firm*—Bachman & LaPointe, P.C.

(57) ABSTRACT

An electricity controller is provided which comprises a first power control means for controlling output power from power generator 4 to a first level during a first period of start-up time for feeding, a second power control means for controlling output power from power generator 4 to a second level lower than first level during a second period after the first period, and a third power control means for controlling output power from power generator 4 to a third level greater than the second level and lower than the first level during a third period after the second period. A discharge tube 2 is heated during the first period for supplying a large amount of electric power to discharge tube 2 to elevate the tube temperature and thereby uniformly disperse mercury vapor in discharge tube 2. Subsequently, while the device maintains the tube at a relatively high temperature during the second period for supplying a small amount of electric power to discharge tube, it can effectively reduce and restrict the release amount of infrared ray from discharge tube 2 in order to enable a remote controller 8 to control a display device immediately after the indication.

16 Claims, 16 Drawing Sheets

FIG. 5
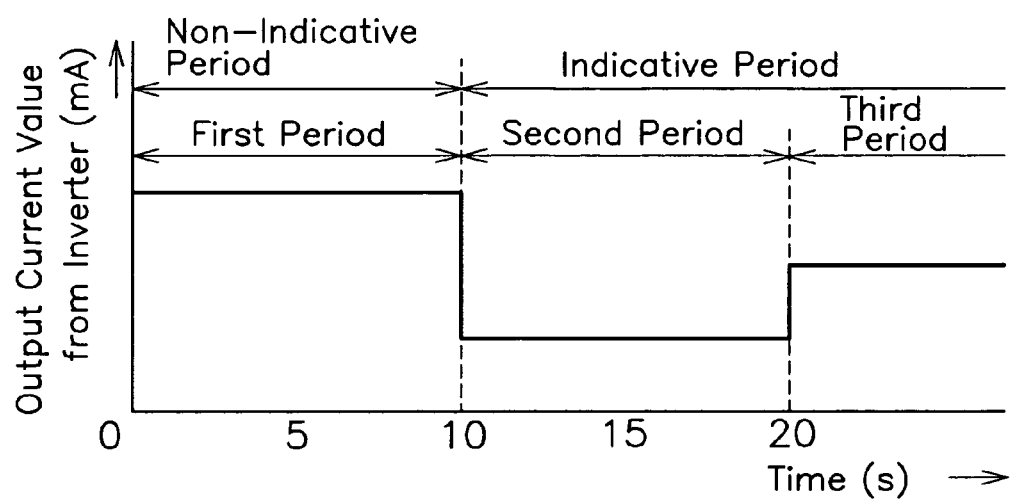
(a)
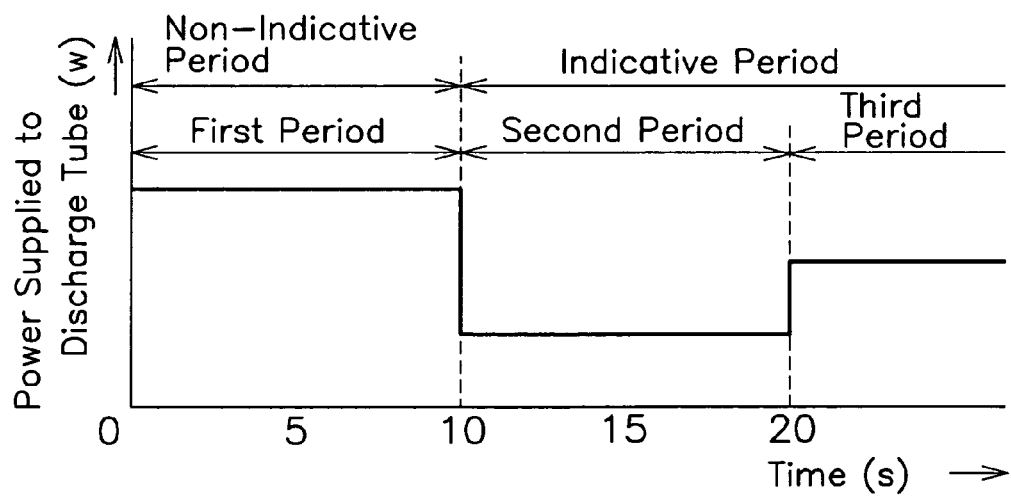
(b)

FIG. 7
(a) 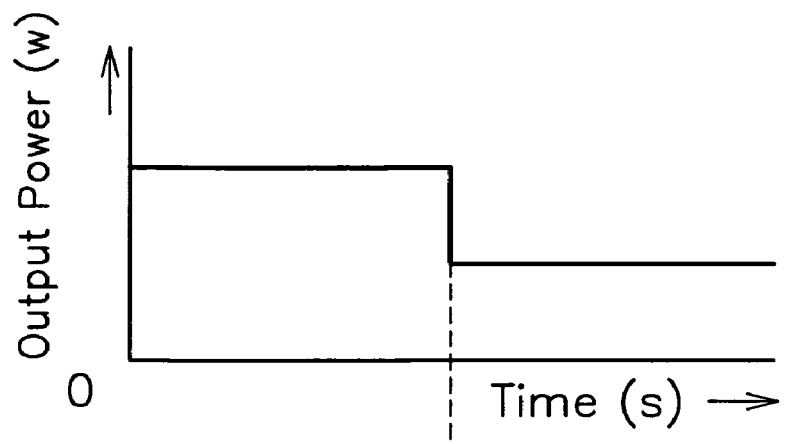
(b) 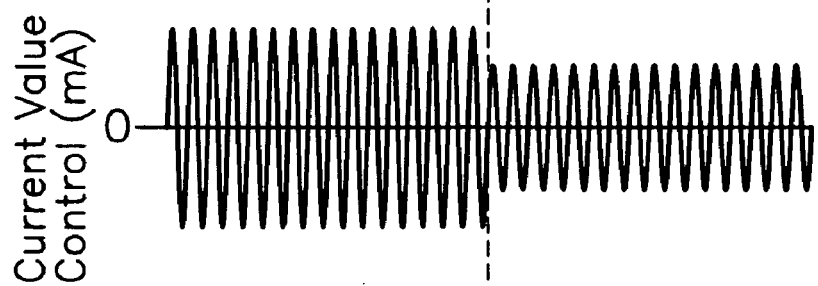
(c) 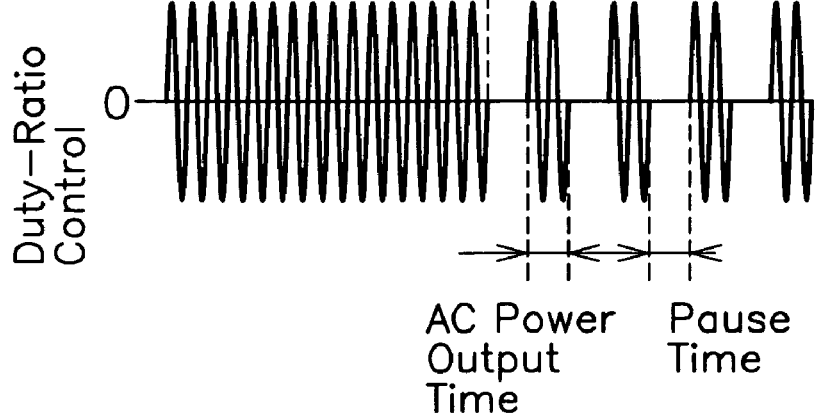
AC Power
Output
Time
Pause
Time FIG. 8
(a)
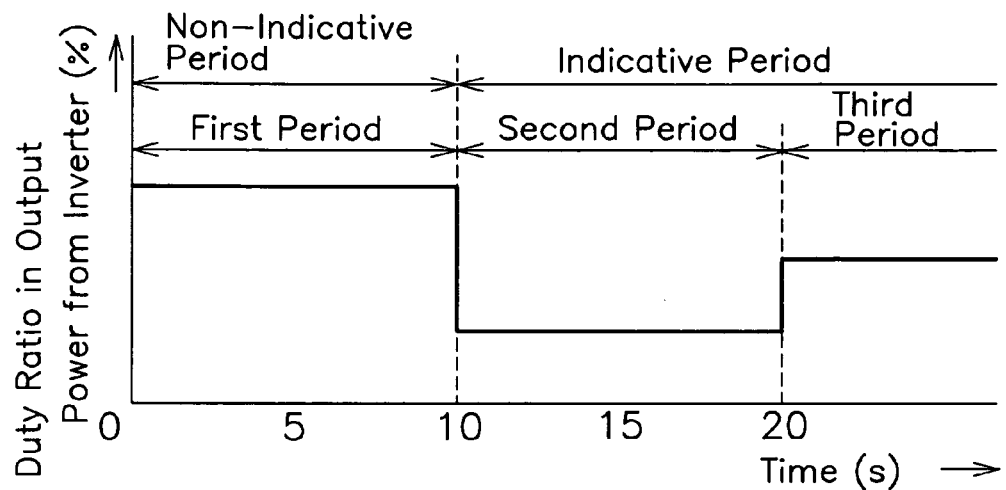
(b)
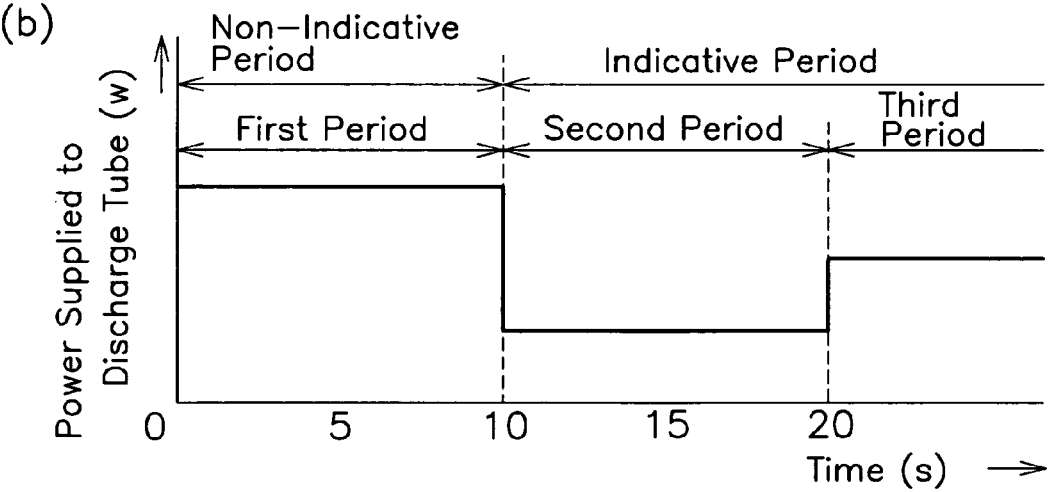

FIG. 9
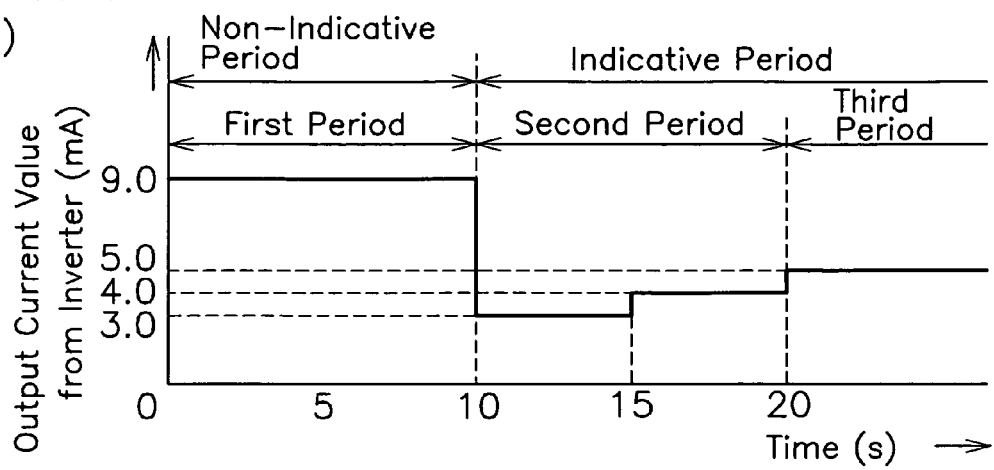
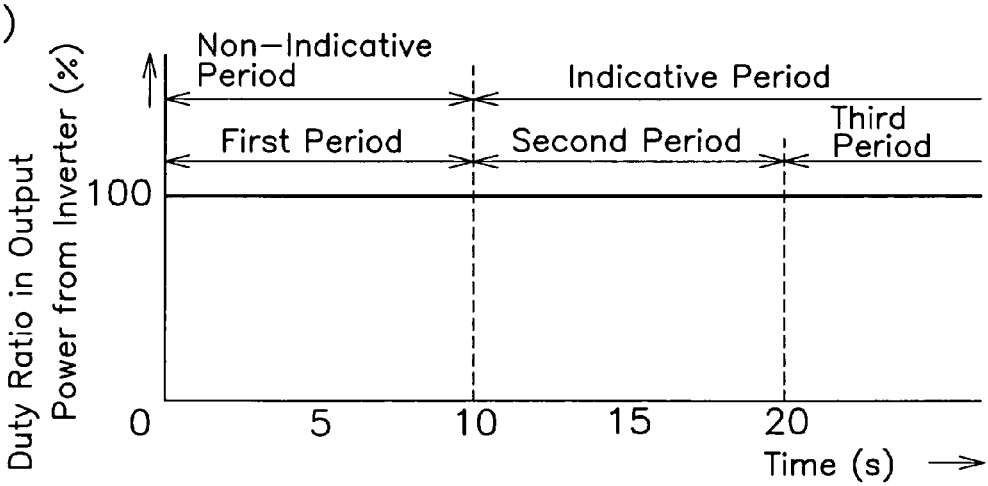
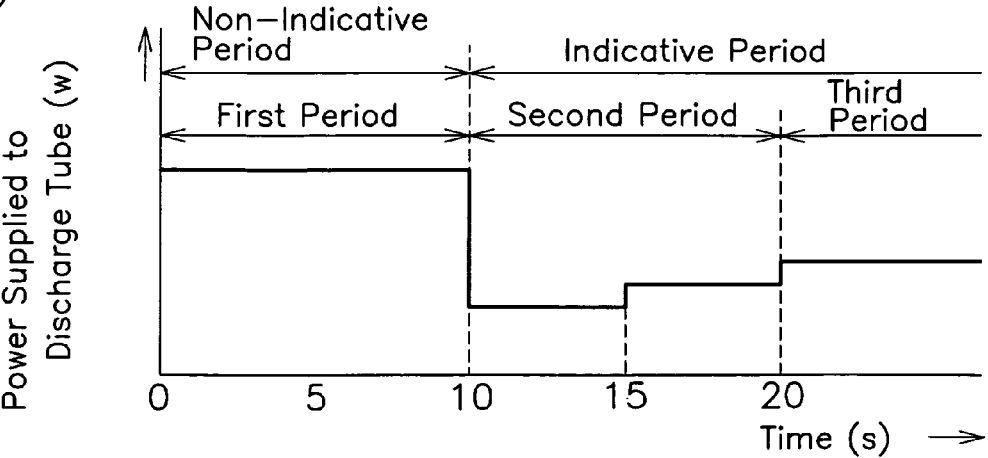

ELECTRICITY CONTROLLER, DEVICE FOR LIGHTING DISCHARGE TUBE, DISPLAY DEVICE AND ELECTRIC POWER CONTROL METHOD

TECHNICAL FIELD

This invention relates to an electricity controller, a device for lighting a discharge tube and a display device, in particular, of the type capable of controlling infrared ray contained in a light emitted from the discharge tube.

BACKGROUND OF THE INVENTION

Discharge tubes such as CCFL or cold cathode fluorescent lamps filled with discharge gas including argon and mercury, have been widely used as a backlight source for displays such as liquid crystal display (LCD). Discharge tube comprises a glass tube filled with mercury and noble gas such as neon, argon or xenon, a pair of electrodes positioned at opposite inner ends of glass tube, and a fluorescent film coated on inner surface of glass tube. Each of electrodes in discharge tube is connected to one end of a lead terminal, the other end of which extends through each end of glass tube to outside. When voltage is applied between a pair of electrodes, electrons are emitted from one of electrodes to produce ultraviolet rays when electrons impinge mercury atoms in glass tube. Ultraviolet rays are converted in wavelength into a visible ray through fluorescent film on inner surface of glass tube, and discharged to outside of glass tube for illumination.

FIG. 18 illustrates a remote controller 8 and a display device such as liquid crystal display television (LCDTV) which has a built-in discharge tube as a backlight source. Display device comprises a display 1 and a lighting device 30 which has a built-in discharge tube not shown as a backlight source. Typically, display device comprises an infrared receiver 6 which can receive infrared signals 21 from remote controller 8 for remote control of for example grazing or switching channels of television. Infrared receiver 6 comprises a light receiving element such as photo-transistor for sensing infrared signals 21 of approximately 910 nm (nanometers) transmitted from remote controller 8.

FIG. 19 is a graph showing a level or mean power level of electric power supplied to discharge tube of prior art display device with time passage. As shown in FIG. 19, after a switch for display device is turned on until turned off, prior art display device continuously supplies a constant AC power set in display device to a discharge tube throughout the first, second and third periods regardless of non-indicative and display periods which respectively deactivates and activates screen of display period. Specifically, the first period denotes a non-indicative time interval of display 1 that starts with completing setting-up of display 1 and terminates with or before indication of screen. The second period denotes a time interval that starts with termination of the first period and extends to an initial stage of indicative time interval of screen after completing setting-up of display 1. The third period denotes a time interval that starts with termination of the second period and terminates when electric input (voltage, current or power) to discharge tube comes to a rated value.

Display device of this type is defective in that it cannot be appropriately controlled by remote controller 8 at the initial stage of indicative time interval for displaying screen because discharge tube disadvantageously irradiates infrared ray which has an undesirable impact on receiving operation by infrared receiver 6. Discharge tube irradiates a light 22 inclusive of visible light and infrared ray of 910 nm in wavelength emitted from discharge gas (argon gas) filled in discharge tube. When a tube voltage is applied between a pair of electrodes of discharge tube to turn discharge tube on, discharge tube sends out light through display screen to outside, and a part of emitted light reaches infrared receiver 6 after reflection on floor, walls or other objects. As a result, infrared receiver 6 cannot distinguish infrared signals 21 of remote controller 8 from infrared ray contained in light 22 out of discharge tube so that infrared ray from discharge tube inconveniently prevents prompt and correct control such as switching channels in display device through infrared signals 21 of remote controller 8 at the initial stage during the indicative time interval for indicating screen of display 1. To avoid such obstruction by infrared ray from discharge tube, for example, Japanese Patent Disclosure No. 2002-323860 has suggested provision of an additional member such as a shutoff sheet disposed adjacent to backlight for interrupting infrared ray therefrom.

However, provision of the additional member such as shutoff sheet would disadvantageously raise cost in manufacture of display device. In another aspect, it seems very difficult to selectively cut off only infrared ray without attenuation of visible light, and also in this view, it is unpractical to provide the additional member such as shutoff sheet.

Accordingly, an object of the present invention is to provide an electricity controller, a device for lighting discharge tube, a display device and an electric power control method that can restrain infrared ray in a light emitted from a discharge tube by controlling operation of drive circuits in the device for lighting discharge tube without need of any additional member such as shutoff sheet against infrared ray.

Another object of the present invention is to provide an electricity controller, a device for lighting discharge tube, a display device and an electric power control method that can overcome the malfunction uncontrollable by a remote controller at the initial stage immediately after the screen indication of display.

SUMMARY OF THE INVENTION

The electricity controller according to the present invention controls output power from a power generator (4) which supplies electric power to a discharge tube (2) filled with discharge gas including argon and mercury. This electricity controller comprises a first power control means for controlling output power from power generator (4) to a first level during a first period of start-up time for feeding, a second power control means for controlling output power from power generator (4) to a second level lower than first level during a second period after the first period, and a third power control means for controlling output power from power generator (4) to a third level greater than the second level and lower than the first level during a third period after the second period.

When relatively large amount of power is supplied to discharge tube (2) during the first period of start-up time for feeding, discharge tube (2) is heated in a short time, and retained at a relatively high temperature to thereby maintain high vapor pressure of mercury in tube even though relatively small amount of power is supplied to discharge tube (2) during the second period after the first period. Specifically, when tube temperature is high with low power supplied to discharge tube (2), infrared ray generated in tube is impinged on and absorbed by mercury vapor in tube. In other words, it is presumed that higher probability of infrared absorption can be established with the higher vapor pressure of mercury in tube to more restrain discharge of infrared ray, thus effectively repressing irradiation of infrared ray from discharge tube (2) to outside. As a result, the device can control release of infrared ray during the second period to prevent malfunction of devices and peripheral devices equipped with the lighting device according to the present invention during the periods other than the first period.

The electricity controller and device for lighting discharge tube according to the present invention inhibits emission of infrared ray from discharge tube during the second and third periods after the first period by controlling only electric power supplied from power generator to discharge tube without any additional member such as shutoff sheet. In case of a display device incorporated with the electricity controller and device for lighting discharge tube according to the present invention, channels in the display device can certainly be switched by transmitting infrared signals from a remote controller to the display device during or after the second period. Also, in another embodiment, the electricity controller according to the present invention can inhibit effluence of infrared ray from discharge tube during the second and third periods and prevents degradation of brightness or intensity on display screen after lapse of the first period to reliably control screen from remote controller.

BRIEF DESCRIPTION OF THE DRAWINGS

The above-mentioned and other objects and advantages of the present invention will be apparent from the following description in connection with preferred embodiments shown in the accompanying drawings wherein:

FIG. 5 is a graph showing temporal variation of electric power supplied to discharge tube in the first embodiment;

FIG. 7 is a graph showing changing waveforms of output current and duty ratio with respect to output power of the inverter in a first example;

FIG. 8 is a graph showing temporal variation of electric power supplied to discharge tube in the second embodiment;

FIG. 9 is a graph showing changing waveforms of output current and duty ratio with respect to output power from an inverter in the first example;

BEST MODE FOR CARRYING OUT THE INVENTION

Embodiments of the electricity controller, device for lighting discharge tube, a display device and an electric power control method according to the present invention are described hereinafter with reference to FIGS. 1 to 17.

Figure 1:
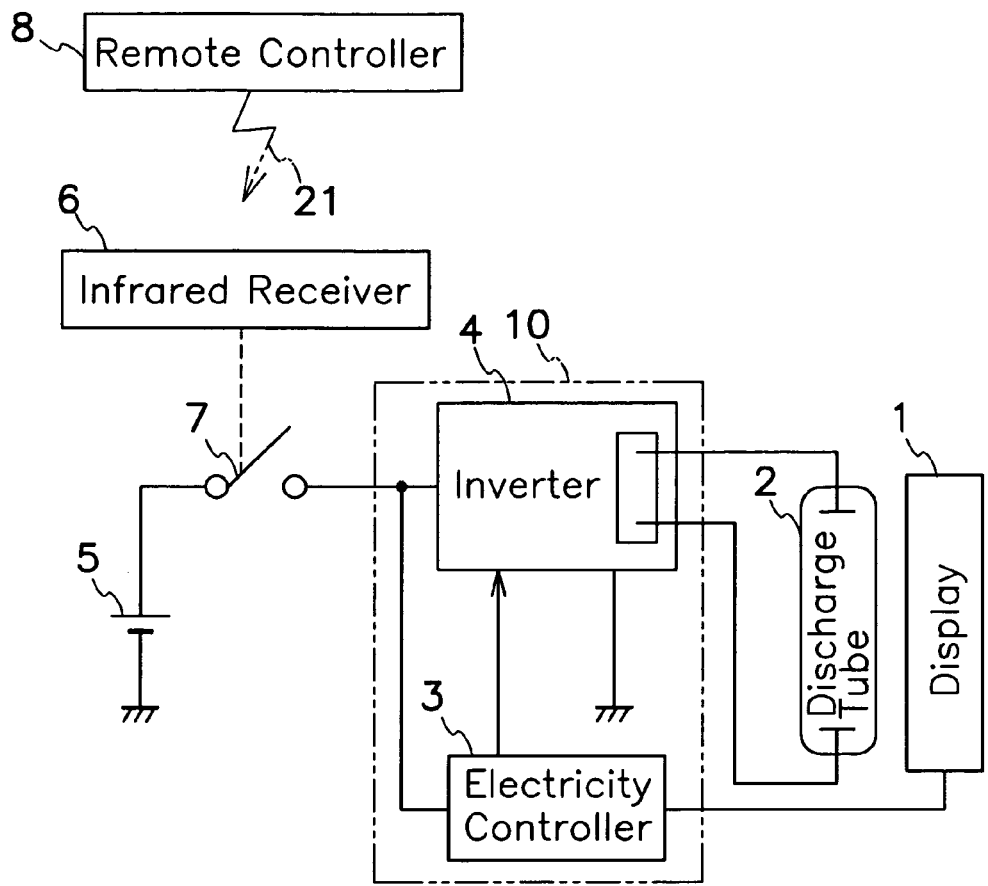
FIG. 1 is a schematic electric circuit diagram showing a first embodiment which includes the electricity controller according to the present invention.

As shown in FIG. 1, the display device such as LCDTV comprises a display 1 having a well-known liquid crystal panel, a discharge tube 2 as a backlight source of display 1, a device 10 for lighting discharge tube 2, a switch 7 turned on and off to control electric power from a DC power source 5 to lighting device 10, and an infrared receiver 6 for receiving infrared or control signals 21 from a remote controller 8 to produce signals for turning switch 7 on and off. Discharge tube 2 is a cold cathode fluorescent tube filled with discharge gas including argon and mercury therein so that argon inevitably irradiates infrared ray of wavelength 910 nm at the initial stage of lighting. DC power source 5 rectifies commercial AC power into DC power to feed a given power to discharge tube 2 through lighting device 10. Infrared receiver 6 comprises a light receiving element such as a photo-transistor for receiving infrared ray of wavelength around 910 nm from remote controller 8, however, it cannot differentiate between infrared ray of wavelength around 910 nm emitted from discharge gas and that from remote controller 8. Accordingly, infrared receiver 6 is confused when it receives infrared ray from discharge gas. Display device accommodates display 1, discharge tube 2, lighting device 10, switch 7 and infrared receiver 6 together.

Lighting device 10 comprises an inverter 4 as a power generator for converting DC power from DC power source 5 into AC power, and an electricity control device or controller 3 for controlling output power from inverter 4 to discharge tube 2 pursuant to the method according to the present invention. Electricity controller 3 has a programmable or programmed one-chip micro-computer or discrete circuits which comprise, not shown but, a first power control means for controlling output power from power generator 4 to discharge tube 2 to a first level during a first period of start-up time for feeding after turning-on of switch 7, a second power control means for controlling output power from power generator 4 to discharge tube 2 to a second level lower than first level during a second period after the first period, and a third power control means for controlling output power from power generator 4 to discharge tube 2 to a third level (a rated power level) greater than the second level and lower than the first level during a third period (for supplying a rated power) after the second period.

In this embodiment, the first and second periods are contained in a non-indicative period wherein screen on display 1 is not indicated. The first period is referred to as an initial period for applying AC power to discharge tube 2 through inverter 4 after turning switch 7 on, in other words, the first period begins at a first point in time (FIG. 3) of turning switch 7 on, and terminates at the time of indicating screen after completion of setting-up of display 1 or at a second point in time (FIG. 3) before indicating screen. Accordingly, the first period includes at least the initial period (non-indicative period) for no indication on screen of display 1. The first period is set, for example with ten seconds. The second period starts with expiration of the first period, namely at the second point in time, and terminates at the initial stage of indicating screen (indication period) after completion of setting-up display 1. In other words, the second period extends from screen indication of display 1 after elapse of the non-indicative period until a predetermined rated power is supplied. If the second point in time is before completion of setting-up display 1, the second period would contain the non-indicative and subsequent indicative periods. The second period is set, for example, with ten seconds. The third period starts at termination of the second period, namely at a third point in time, and goes on so long as a predetermined rated power is continuously applied to discharge tube 2. In this case, however, the rated power does not necessarily need to be kept constant, and for instance, it can be changed or controlled in response to any condition such as interior illumination. A control technique of rated power in response to any requirement is well-known, and further detailed description thereon is omitted.

It should be noted that the present invention is characterized by the specific control technique of modulating electric power provided to discharge tube 2 during periods before the third period for feeding rated power, not by the regulatory technique for controlling the rated power. In a prior art display device, a rated power is applied to discharge tube during the first and second periods similarly to the third period. In detail, an uncontrolled rated power prescribed for each display is supplied to discharge tube 2 from turning-on to turning-off of switch 7 for display without difference in power level among the first to third periods so that a relatively large amount of infrared ray is emitted from discharge gas in discharge tube during the non-indicative period and at the initial stage of the indicative period. Accordingly, even though screen of display is indicated, disadvantageously, it cannot be controlled by remote controller 8 within a given period of time immediately after indication of screen. According to the present invention, lighting device 10 can control infrared ray radiated from discharge tube 2 by supplying to discharge tube 2 power of a first level greater than rated level during the first period and then power of a second level smaller than rated level during the second period, thus differentiating the power levels between the first and second periods.

Figure 2:
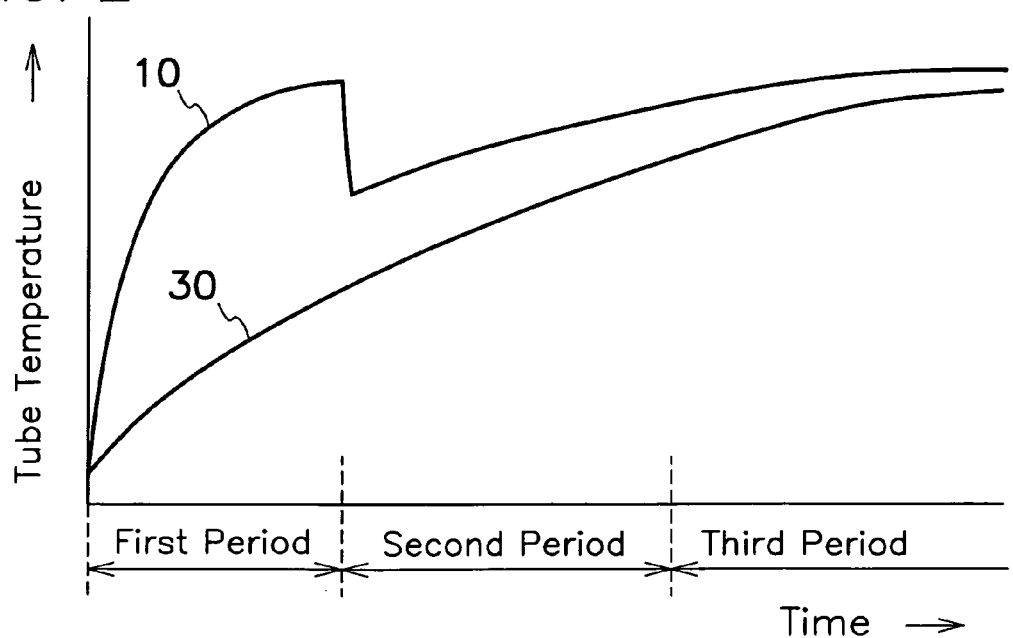
FIG. 2 is a graph indicating variation of tube temperature with time course of feeding electricity to a discharge tube.

FIG. 2 is a graph showing variation in tube temperature (temperature on tube walls) of discharge tube 2 throughout the first, second and third periods. Prior art lighting device 30 indicates gradual increase in tube temperature with time course for feeding a constant rated electric power. On the contrary, electricity controller 3 according to the present invention causes lighting device 10 to supply electricity greater than a rated power in a short time during the first period so that discharge tube 2 is heated to and kept at an elevated temperature before passage to the second period to disperse a large amount of mercury vapor within discharge tube 2, and therefore, high vapor pressure of mercury can preferably be retained in discharge tube 2 even though a relatively small amount of electric power is supplied to discharge tube 2 during the second period next to the first period. More specifically, it is believed that infrared ray emitted in tube collides with and absorbed by mercury vapor to thereby effectively inhibit undesirable irradiation of infrared ray because probability in infrared absorption by mercury vapor becomes higher with more increased vapor pressure of mercury in tube to more restrain discharge of infrared ray so that irradiation of infrared ray from discharge tube 2 to outside can effectively be repressed under the condition of feeding low electric power to discharge tube 2 at high temperature. In addition, during the second period, supplied power is decreased to reduce occurrence amount of infrared ray by discharge gas so that the device can preferably control release of infrared ray to outside of display 1 in cooperation with the infrared absorption action by mercury vapor. By virtue of this, screen on display 1 can reliably be switched by means of remote controller 8 immediately after screen indication on display 1.

Figure 3:
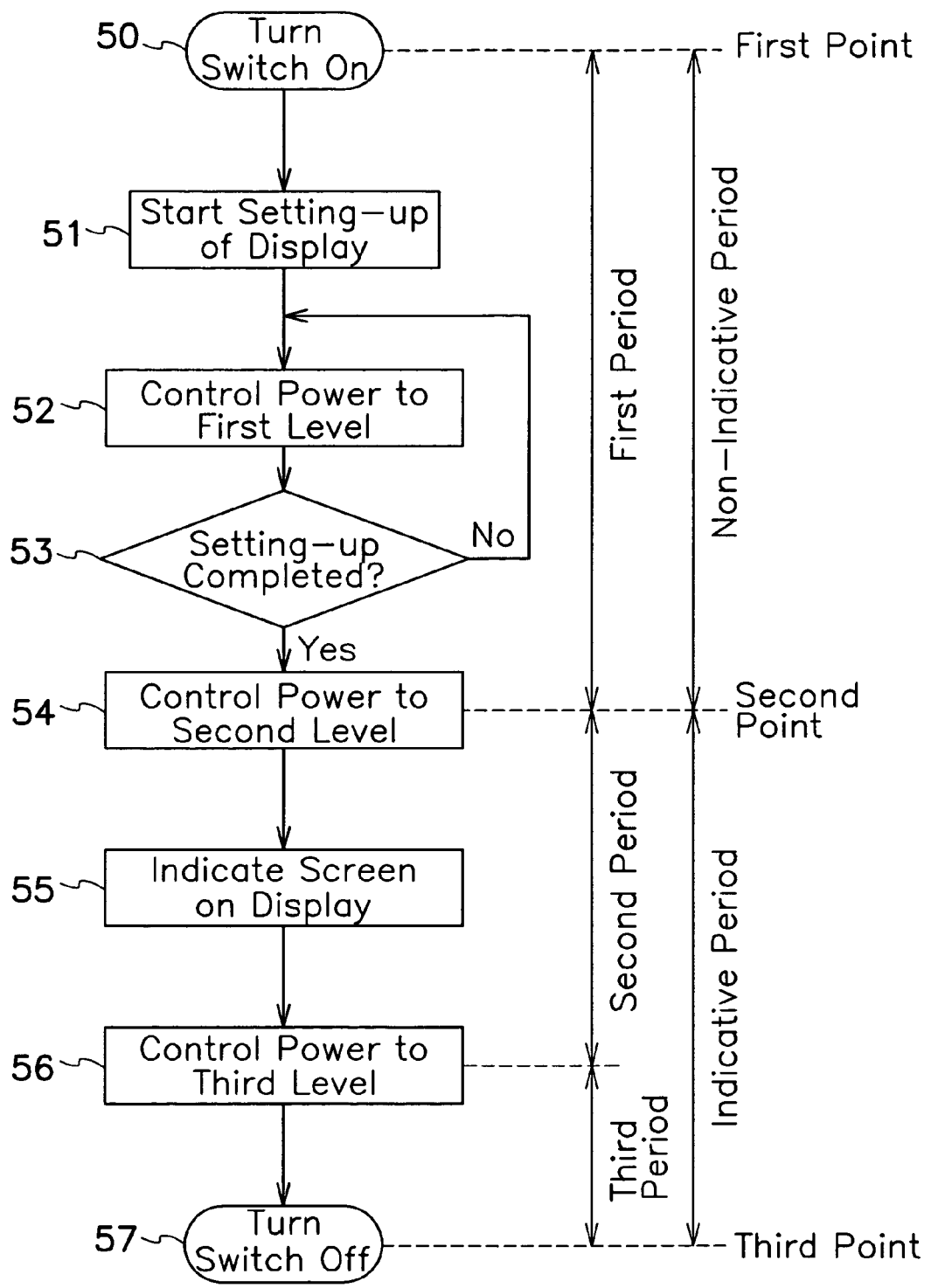
FIG. 3 is a flow chart representing electric operation of the electricity controller shown in FIG. 1.

Operation of display 1 of the embodiment is described hereinafter in connection with operational sequence by flow chart shown in FIG. 3. First of all, when switch 7 of display device is turned on, electricity controller 3 produces a first signal to inverter 4 which therefore starts operation to supply electric power to display 1 and trigger setting-up for display 1. This setting-up operation cannot immediately finish and requires a given delay time until screen on display 1 is indicated. During the delay time, lighting device 10 provides discharge tube 2 with electric power of a first level greater than a rated power (Step 52). Electricity controller 3 produces signals for controlling output power from inverter 4, and causes inverter 4 to supply discharge tube 2 with power of the first level greater than that of rated power during the first period until screen on display 1 is indicated.

When constant delay time has passed, setting-up operation for display 1 is completed (Step 53) to indicate screen of display 1 (Step 55). Electricity controller 3 provides inverter 4 with a second signal at the same time of or slightly before screen indication of display 1 in Step 55 to cause inverter 4 to produce a second level of power lower than the first level. When a predetermined period of time has passed after screen indication of display 1, inverter 4 produces power of a third level (Step 56). Tube current and voltage tend to fluctuate under influence of impedance across discharge gas or the like at the initial stage of lighting discharge tube 2. Accordingly, Figures of the drawings indicate each mean or averaged value of the first, second and third power, current or voltage levels during the first, second and third periods. Electricity controller 3 adjusts output from inverter 4 at the third level until a switch of the display device is turned off in Step 57.

Figure 4:
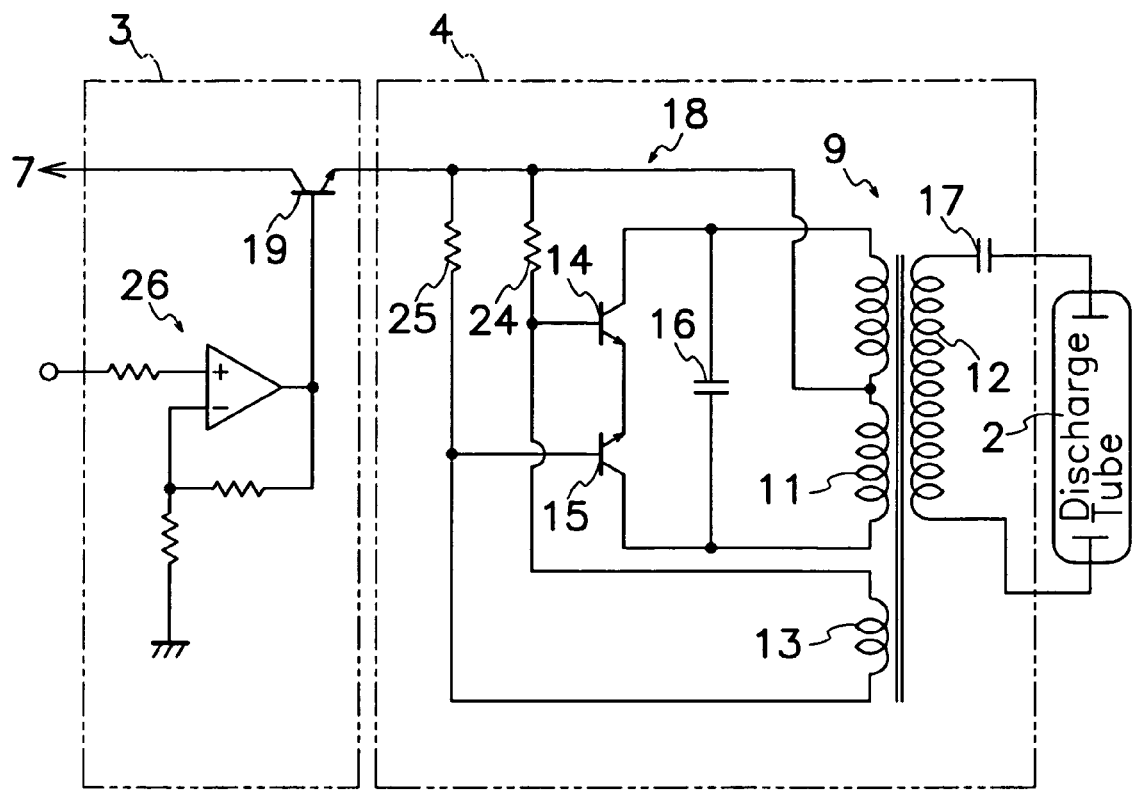
FIG. 4 is an electric circuit diagram showing the electricity controller and an inverter shown in FIG. 1.

FIG. 4 illustrates an electric circuit diagram showing the first embodiment of the lighting device 10 which controls electric power during the first and second periods by varying current (or output voltage) and amplitude (or crest value) of output from inverter 4. As shown in FIG. 4, inverter 4 comprises an output transformer 9 and an oscillation circuit 18, and output transformer 9 comprises a primary winding 11 provided with a center tap, a secondary winding 12 and a feedback winding 13. Discharge tube 2 is connected to both ends of secondary winding 12 through a varactor capacitor 17 which has the function for restricting excess current flowing through discharge tube 2 due to high voltage applied at the initial stage of lighting. Oscillation circuit 18 comprises a positive feedback amplifier which involves primary and feedback windings 11 and 13, a pair of first and second transistors 14 and 15 and a capacitor 16. In this arrangement, first and second transistors 14 and 15 and capacitor 16 are connected in parallel to each other and to both ends of primary winding 11, and base terminals of first and second transistors 14 and 15 are respectively connected to one and the other ends of feedback winding 13.

Electricity controller 3 comprises a third transistor 19 which has a collector terminal connected to a positive output terminal of a DC power source 5 and an emitter terminal connected to a positive output terminal of inverter 4, and an amplifier 26 whose output terminal is connected to a base terminal of third transistor 19. Base terminals of first and second transistors 14 and 15 are respectively connected to emitter terminal of third transistor 19 through resistors 24 and 25. When input voltage to amplifier 26 is raised, output voltage from electricity controller 3 is increased to augment output current from inverter 4. Adversely, when input voltage to amplifier 26 is lowered, output voltage from electricity controller 3 is reduced to diminish output current from inverter 4. Accordingly, in order to produce electric power of first, second and third levels from inverter 4 respectively during the successive first, second and third periods, applied to input terminal of amplifier 26 are voltage of in turn a relatively high first level, a second level lower than first level and a third level lower than first level but higher than second level respectively during the first, second and third periods. Actually, input voltage to amplifier 26, namely output current from inverter 4 can be controlled as shown in FIG. 5(a) when electric power supplied to discharge tube 2 is varied during the first, second and third periods as shown in FIG. 5(b).

In this embodiment, an integrated circuit is programmed to configure first, second and third power control means in the integrated circuit, alternatively, different or a plurality of discrete circuits may be configured to build-up first, second and third power control means of electricity controller 3.

Figure 6:
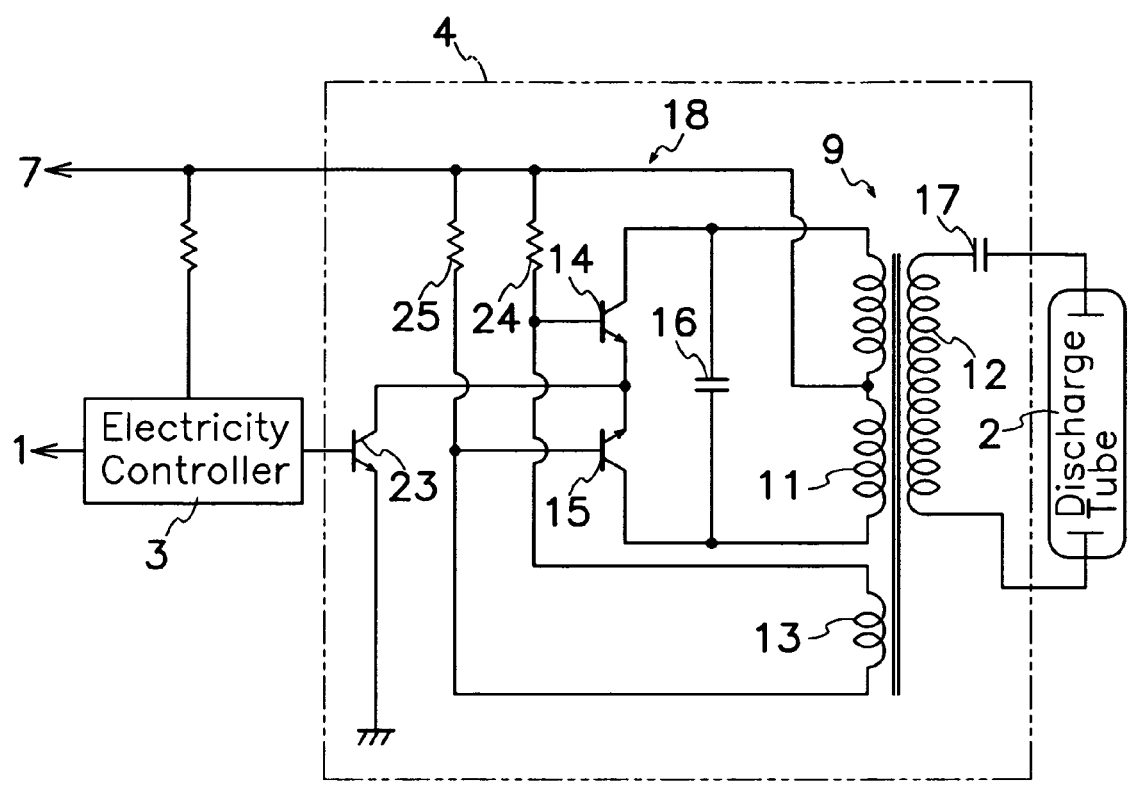
FIG. 6 is an electric circuit diagram showing an inverter according to a second embodiment of the invention.

FIG. 6 is an electric circuit diagram showing a second embodiment of the lighting device 10 for controlling electric power delivered to discharge tube 2 during the first and second periods with pause in output from inverter 4. FIG. 6 represents inverter 4 including an output transformer 9 and an oscillation circuit 18 which comprise same kind of or similar electric parts, devices and elements as those shown in FIG. 4. However, unlike FIG. 4, inverter 4 shown in FIG. 6 comprises a switch constituted by a fourth transistor 23 which has a collector terminal connected to emitter terminals of first and second transistors 14 and 15 of oscillation circuit 18. Emitter terminal of fourth transistor 23 is grounded. Electricity controller 3 furnishes output signals for base terminal of fourth transistor 23. When fourth transistor 23 is turned off by failure of output signals from electricity controller 3, oscillation circuit 18 stops oscillating action together with abeyance of primary and feedback windings 11 and 13, first and second transistors 14 and 15 and capacitor 16 to constitute oscillation circuit 18.

Electricity controller 3 is a duty-ratio controller for regulating output power from inverter 4, namely AC power directed to discharge tube 2. Practically, when electricity controller 3 produces an on-signal to base terminal of fourth transistor 23 which thereby is turned on to start oscillating operation of oscillation circuit 18, and therefore, AC power is supplied to discharge tube 2. On the other hand, when electricity controller 3 produces an off-signal to base terminal of fourth transistor 23 which thereby is turned off to stop oscillating operation of oscillation circuit 18, and AC power to discharge tube 2 is terminated for pause. Thus, electricity controller 3 can adjust amount of AC power supplied to discharge tube 2 by changing time span for output of AC power, or duty-ratio [namely AC power output time/(AC power output time plus pause)]. Electricity controller 3 shown in FIG. 4 shifts amplitude of output current for modulation of electric power as shown in FIG. 7(b), unlike this, electricity controller 3 shown in FIG. 6 alters duty-ratio as shown in FIG. 7(c) for control of electric power. In the embodiment of FIG. 6, electricity controller 3 causes inverter 4 to regulate the time span for outputting AC power to a predetermined time length, alternately providing output time span and pause.

For example, when electricity controller 3 increases duty-ratio of time span for outputting AC power, in other words, decreases duty-ratio of pause time, AC power (mean power) to discharge tube 2 rises. In order to maintain electric power on the first level during the first period, as shown in FIG. 8, the device 3 selects relatively high first duty-ratio of time span for outputting AC power during the first period. To maintain electric power on the second level lower than the first level during the second period after the first period, the device 3 selects relatively low second duty-ratio of time span for outputting AC power during the second period. Further, to maintain electric power on the third level higher than the second level but lower than the first level during the third period after the second period, the device 3 selects the duty-ratio of time span between first and second duty-ratios for outputting AC power during the third period. If the device 3 controls outputs to inverter 4 during the first, second and third periods as shown in FIG. 8(a), electric power to discharge tube 2 can be regulated as shown in FIG. 8(b) which represents variation of electric power supplied to discharge tube 2 of lighting device 10 according to the second embodiment throughout first, second and third periods. Duty-ratio for each period can be settled by control means such as timer circuit built-in electricity controller 3.

In the first and second embodiments, optimum values of controlled power during the first period can experimentally be selected to heat discharge tube 2 and thereby produce enough amount of mercury vapor to restrain release of infrared ray in tube. For example, with greater amount of output power during the first period, mercury vapor more increases the inhibitory effect on release of infrared ray during the second period. However, if excessive amount of power is supplied, service life of discharge tube 2 is reduced, and therefore, output power should have an appropriate value. Similarly, optimum values of controlled power during the second period can also be experimentally be selected. Accordingly, the timing may be previously set to switch the first to the second period, but otherwise, any detecting means not shown for sensing the time of completing the setting-up action of display 1 may be used to switch the first to the second period. Also, in lieu of self-oscillation circuits shown in the embodiments, separate oscillation or excitation circuits may be used. Accordingly, means for ceasing oscillation of oscillation circuit 18 is not limited to that exemplified in FIG. 6. Electricity controller 3 shown in FIG. 4 can control output power by changing amplitude of output current or voltage from inverter 4, and therefore, it does not need to vary duty-ratio of AC power to discharge tube 2 for each period like electricity controller 3 of FIG. 6. By way of example, duty-ratio for periods of AC power output may be fixed at 100%.

Figure 11:
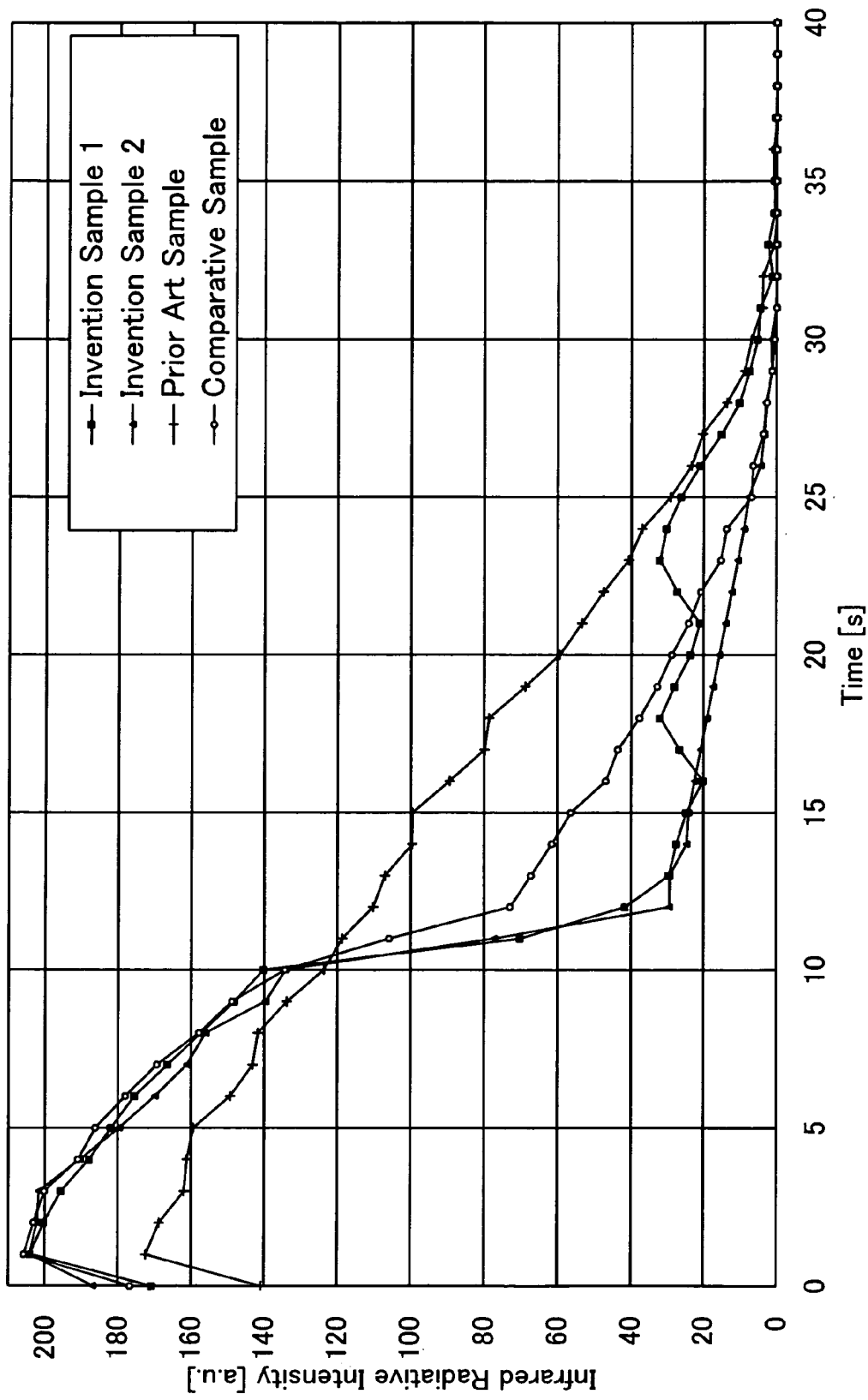
FIG. 11 is a graph representing the infrared-inhibition effect in first and second examples.
Figure 12:
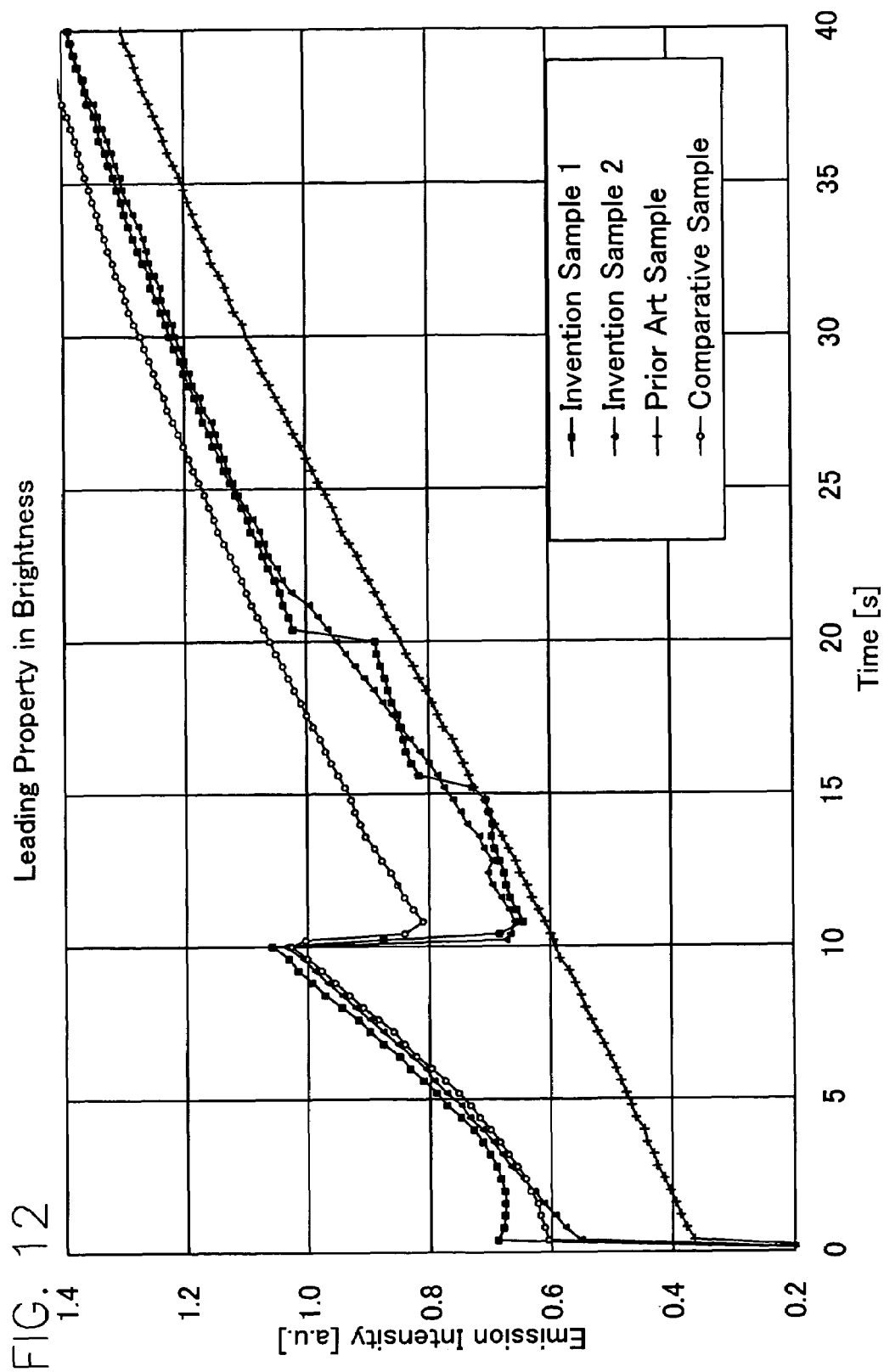
FIG. 12 is a graph showing the rising property in brightness in first and second examples.

FIGS. 11 and 12 show graphs indicating variations in respectively radiant intensity and brightness of infrared ray emitted from four samples of discharge tubes which include Invention Samples 1 and 2, Prior Art Sample and Comparative Sample. Actual tests were carried out utilizing LCDs of 22 inches with subjacent backlights of cold cathode fluorescent tube, adopting the first period (non-indicative period) of 10 seconds, and the second period of 10 seconds after indication of display 1 (during the indicative period) to obtain these experimental data.

Figure 10:
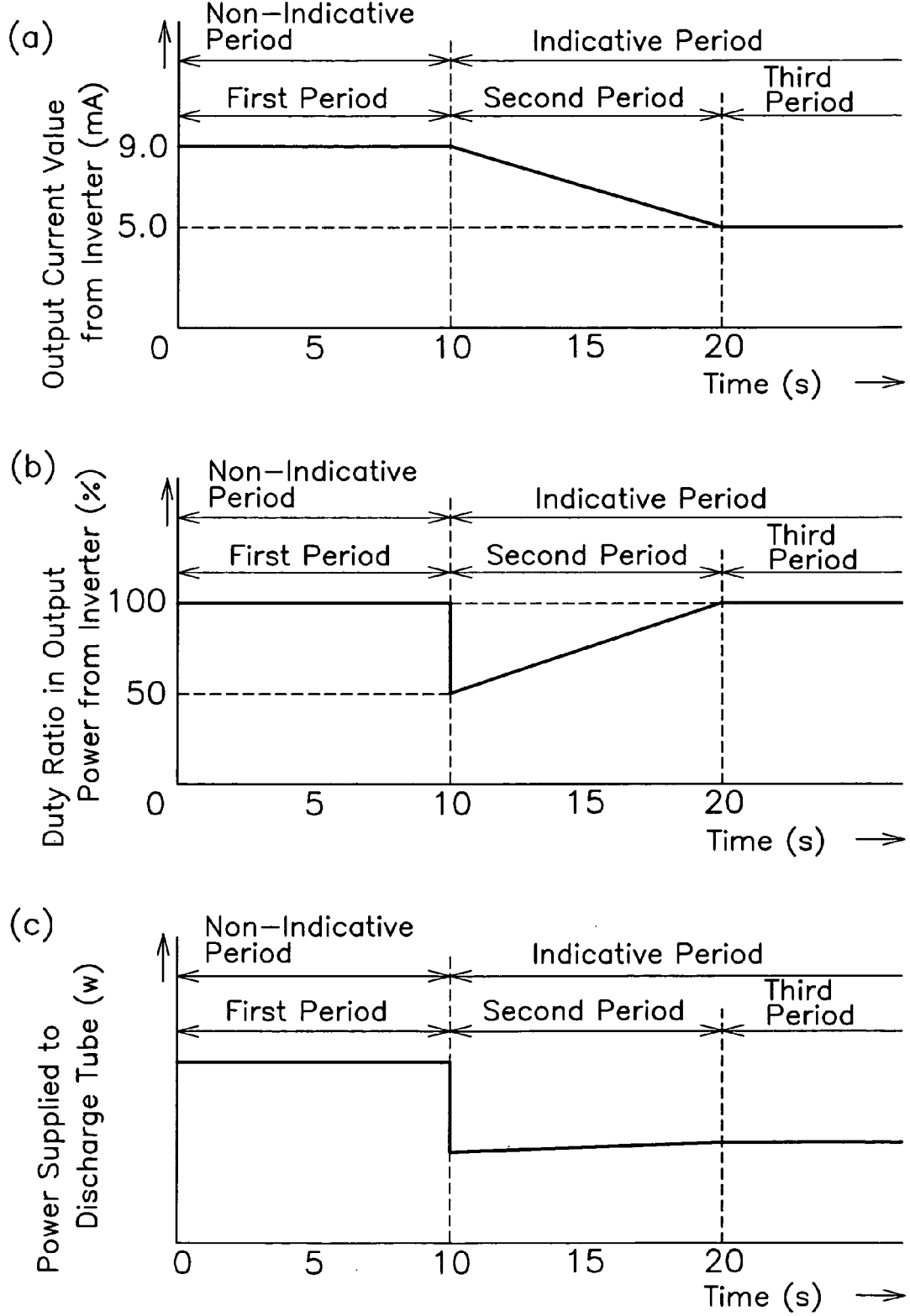
FIG. 10 is a graph showing changing waveforms of output current and duty ratio with respect to output power from an inverter in a second example.

In these tests, output current through prior art inverter was 5.0 mA with the constant duty-ratio of 100%. Under the output current controlled constant, vapor pressure in tube rises with increase in tube temperature, and discharge amount of infrared ray gradually decays. At this moment, brightness gradually increases with elevation of ambient or tube temperature. As shown in FIG. 9, output current from inverter 4 to discharge tube 2 for Invention Sample 1 was controlled to be 9.0 mA for the first period, 3.0 mA for anterior half five seconds of the second period, 4.0 mA for posterior half five seconds of the second period, and 5.0 mA for the third period with the constant duty-ratio of 100%. For convenience of explanation, it is assumed that a constant electric power is supplied to discharge tube as shown in FIG. 9(c) with constant output current, however, actually, both of tube voltage and power are slightly lowered with elevation of tube temperature, even with constant output current. As shown in FIG. 10, output current from inverter 4 to discharge tube 2 for Invention Sample 2 was controlled to be 9.0 mA for the first period with 100% duty-ratio, 5.0 mA for the third period with the constant duty-ratio of 100%, and for the second period, output current was gradually reduced from 9.0 mA to 5.0 mA with progressive increase in duty-ratio from 50% to 100% to by degrees augment electric power to discharge tube. Also, output current from inverter 4 to discharge tube 2 for Comparative Sample was controlled to be 9.0 mA for the first period, and 5.0 mA for the second and third periods with constant duty-ratio of 100% throughout the first, second and third periods.

FIG. 11 is a graph showing temporal variation of infrared radiant intensity emitted from liquid crystal surface after turning-on of switch 7. In the display device such as LCDTV according to this embodiment, infrared receiver 6 does not produce malfunction resulted from infrared ray irradiated from discharge tube if relative radiant intensity of infrared ray emitted from display 1 is less than 60 a.u. (arbitrary unit). As understood from graphs of small square and triangle dot curves in FIG. 11, Invention Samples 1 and 2 can more reduce infrared radiant intensity below 60 a.u. within one to two seconds after completion of setting-up display 1, namely just ten seconds after turning-on of switch 7 whereas Comparative and Prior Art Samples shown by graphs of small cross and circle dot curves cannot relatively and rapidly attenuate infrared radiant intensity. Comparative Sample indicates that it can more debase radiant intensity of infrared ray than Prior Art Sample does, however, the former Sample is still unsatisfactory because it produces malfunction by infrared ray for around five seconds after completion of setting-up display 1.

Thus, lighting devices 10 of Invention Samples 1 and 2 modulate electric power delivered to discharge tube 2 to enable changeover of channels and so forth by transmitting infrared ray from remote controller 8 to display device immediately after screen indication on display 1. In addition, the device can well restrain discharged amount of infrared ray after screen indication on display 1 by shifting the first period to the second period substantially synchronously with completion of setting-up display 1. In another way, the first period may be shifted to the second period before completion of setting-up in display 1. While display devices such as LCDTV according to prior art technique were inconveniently inhibited to change screens of the devices for approximately ten seconds or for more than twenty seconds in cold weather at the initial stage after screen indication of display, the present invention can fully overcome such inconvenience.

The present invention can be reduced to practice in any embodiments that the claims cover, in addition to or in lieu of embodiments shown in FIGS. 1 to 12 because the present invention is not limited to the latter embodiments. More specifically, in the foregoing embodiments, electricity controller 3 performs its basic operation with changeover from the first to the second period concurrently with shift from the non-indicative period to the indicative period of display device, instead, changeover may be made from the first to the second period during the non-indicative or indicative period after the non-indicative period although suppressant function for depressing radiative amount of infrared ray from discharge tube may be lowered. Without limiting any one of amplitude control and duty-ratio control, lighting device 10 may coincidentally apply both of amplitude and duty-ratio controls to output power from inverter 4. Also, output power from inverter 4 may be increased stepwise, step-by-step or continuously. Higher electric power can be selected utilizing more than 9.0 mA of electric current as shown for Invention Samples 1 and 2 to accelerate heating of discharge tube 2 for shorter time. For instance, higher electric power may be set with electric current on the order of 15.0 mA even if attended by evils of decrease in lifetime of discharge tube 2. In any event, the present invention is not confined by output current from inverter 4 or numerical ranges of duty-ratio. Also, ordinary skill would select or decide optional, appropriate or needed delay time for setting-up of display 1 for the first, second and third periods. Moreover, if necessary, a fourth, fifth or further period may be provided in control time for adjusting output power from inverter 4 in addition to or without a curb on the only first, second and third periods. The present invention is not applied restrictively to only CCDTV, and also applicable to display devices for such as personal computers, navigation displays, video monitors and amusement displays.

In addition, lighting device 10 may have deactivating means for ceasing operation of infrared receiver 6 (not shown) for receiving the infrared control signals during the non-indicative period of screen on display 1. For example, the deactivating means comprises a hindering device for barring incidence of infrared signals from remote controller 8 and infrared ray from discharge tube 2 into a light receiving element of infrared receiver 6 for a certain period of time corresponding to the non-indicative period. As the hindering device serves to cease receiving action of infrared ray by infrared receiver 6 during the non-indicative period of screen on display 1, it can prevent malfunction of infrared receiver 6 by infrared ray radiated from discharge tube 2 activated with large amount of electric current passing therethrough in this embodiment.

Figure 13:
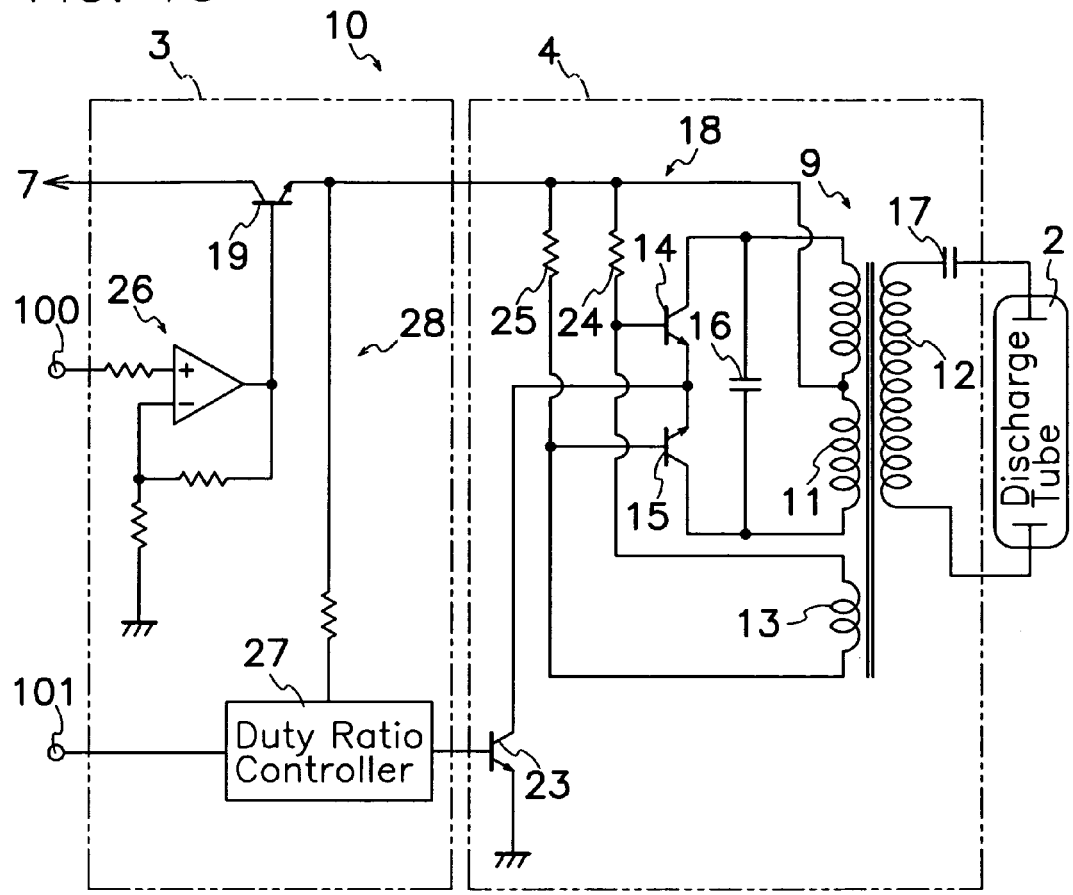
FIG. 13 is an electric circuit diagram showing a third embodiment which includes the electricity controller and inverter.

Then, referring to FIG. 13, it shows a third embodiment of a lighting device 10 according to the present invention for providing output from inverter 4 with a pause and gradually lowering power level to control electric power during the second period. In the first and second embodiments, mean or averaged AC power to discharge tube 2 is controlled wherein a first mean AC power supplied during the first period, is greater than a third mean AC power supplied during the third period; a second mean AC power supplied during the second period after the first period, is smaller than the third mean AC power; and a third mean AC power is at a predetermined rated level during the third period after the second period. Lighting device 10 causes inverter 4 to supply mean power greater than a rated level during the first period to heat discharge tube 2 up to an elevated temperature for a short time so that a large amount of mercury vapor is dispersed in discharge tube 2. Accordingly, infrared ray irradiated from discharge gas filled in discharge tube 2, collides with and then is effectively absorbed by the large amount of mercury vapor to preferably control infrared radiation from discharge tube 2 at the initial stage of the indicative period for indicating screen after the first period. Consequently, from the time immediately after indication of screen, channels of display device can be switched or controlled by remote controller 8.

The aforesaid technique for supplying electric power to discharge tube 2 can desirably inhibit infrared radiation from discharge tube 2 after passage of the first period, however, it has a defect of decrease in brightness of discharge tube 2 during the second period because mean power to discharge tube 2 during the second period is reduced to a level lower than that of mean power supplied during the third period. In this view, the third embodiment of the present invention contemplates that infrared radiation from discharge tube is preferably adjusted upon indication of screen after the first period, preventing decrease in brightness of discharge tube during the second period to dissolve or overcome uncontrollable condition by remote controller 8.

As shown in FIG. 1, lighting device 10 comprises an inverter 4 for converting DC power from a DC power source 5 into AC power supplied to a discharge tube 2, and an electricity controller 3 for controlling output power from inverter 4, namely input power to discharge tube 2 in accordance with the technique according to the present invention. Like the first and second embodiments, electricity controller 3 has a programmable or programmed one-chip micro-computer or discrete circuits which comprise a first power control means for controlling a first power supplied to discharge tube 2 during a first period followed upon turning-on of switch 7, a second power control means for controlling a second power supplied to discharge tube 2 during a second period followed upon the first period, and a third power control means for controlling a third power supplied to discharge tube 2 during a third period followed upon the second period. The first power is given as a first mean power during the first period, the second power is given as a second mean power lower than the first mean power during the second period after the first period, and the third power is given as a third mean power or predetermined rated power lower than the first mean power during the third period or rated power supply period after the second period. Lighting device 10 may be of an integrated circuit which is programmed to configure first, second and third power control means in the integrated circuit, however, alternatively, different or a plurality of discrete circuits may be configured to form first, second and third power control means of electricity controller 3.

Figure 14:
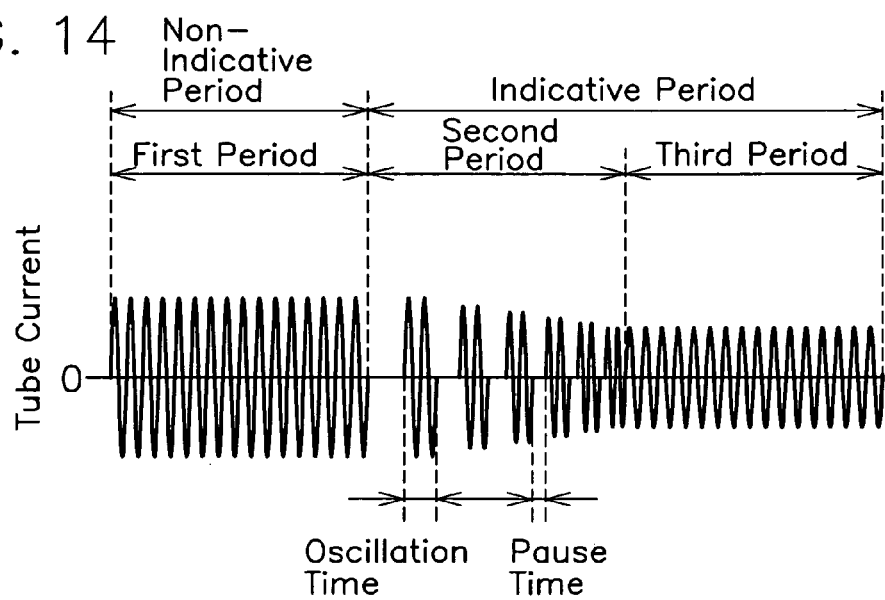
FIG. 14 is a graph showing temporal variation of tube current in the third embodiment.

The third embodiment of the present invention is characterized in that the second period includes alternately occurring oscillation and pause time spans as shown in FIG. 14. In the shown waveform, no power is supplied to discharge tube 2 during the pause time span, however, to attain the same object, in place of combined oscillation and pause time spans, the second period may actually comprise first and second oscillation time spans wherein power level supplied to discharge tube 2 during the second oscillation time span, is lower than that supplied to discharge tube 2 during the first oscillation time span. Accordingly, the present invention contemplates an electricity controller 3 that has first and second oscillation time spans during the second period including the initial stage for indication of screen without controlling rated power to discharge tube 2. In this case, mean power level during each first oscillation time span of the second period is higher than a rated power supplied to discharge tube 2; and mean power level during each second oscillation span of the second period is lower than the rated power supplied to discharge tube 2.

Operation of the third embodiment shown in FIG. 13 is described hereinafter with reference to flow chart shown in FIG. 3. Initially, when switch 7 of display device is turned on in Step 50, electricity controller 3 produces a first signal to inverter 4 to start operation of inverter 4, feed electricity to display 1 and start setting-up operation of display 1 (Step 51). Electricity controller 3 forwards signals for controlling output power from inverter 4 which supplies a first power to discharge tube 2 during a first period from turning-on of switch 7 to indication of screen on display 1. In this case, setting-up operation of display 1 is not finished immediately, and there is a certain delay time during the first period through which inverter 4 provides discharge tube 2 with the first power of mean level greater than rated power (Step 52).

Once the delay time has elapsed, setting-up operation of display 1 is completed (Step 53), and screen on display 1 is indicated (Step 55). At the same time of or slightly before indication of screen on display in Step 55, electricity controller 3 delivers a second power to inverter 4 so that the second period comprises the alternately given first and second oscillation time spans. During the first and second oscillation time spans, inverter 4 produces the second power of respectively and alternately different levels higher and lower than mean level of power supplied during the third period (Step 54). One example of lower level during the second oscillation time span includes zero level power to discharge tube 2 for pause as shown in FIG. 14. In any event, mean power supplied to discharge tube 2 during the second period is set above mean power during the third period. For example, mean tube current during the first and second oscillation time spans are set as respectively 10.0 mArms and 0.0 mArms, and the first and second oscillation time spans are repetitiously developed with the duty ratio discussed later. After all, the second power is controlled and maintained to a mean tube current of 5.0 mArms during the second period.

When a predetermined period of time has passed after indication of screen on display 1, electricity controller 3 provides inverter 4 with a third signal so that discharge tube 2 is supplied a third power of the mean level, namely rated power level lower than that during the first period (Step 56). At the initial stage of lighting discharge tube 2, tube current or tube voltage tends to fluctuate under the influence of impedance or the like across discharge gas, as well as under the effect of variation in tube voltage or current by electricity control means discussed hereinafter. Electricity controller 3 retains rated power output from inverter 4 until switch 7 and display device are turned off for termination of the third period. By way of example, electricity controller 3 in the third embodiment adjusts output power to maintain mean tube current at a constant level of 5.0 mArms during the third period.

As illustrated in FIG. 13, inverter 4 comprises an output transformer 9 and an oscillation circuit 18, and output transformer 9 comprises a primary winding 11 with center tap, a secondary winding 12, and a feedback winding 13. A discharge tube 2 is connected to both ends of secondary winding 12 through a ballast capacitor 17 which has the function for limiting excess current through discharge tube 2 under high voltage induced in related circuits at an early stage of lighting. Oscillation circuit 18 constitutes a positive feedback amplifier which comprises primary winding 11, feedback winding 13, first and second transistors (switching elements) 14 and 15 and capacitor 16. In this circuitry, first and second transistors 14 and 15 and capacitor 16 are connected in parallel to each other and to both ends of primary winding 11, and base terminals of first and second transistors 14 and 15 are respectively connected to one and the other ends of feedback winding 13.

Also, inverter 4 further comprises a fourth transistor 23 as a switch which has a collector terminal connected to emitter terminals of first and second transistors 14 and 15, and a grounded emitter terminal. Base terminals of first and second transistors 14 and 15 are connected to a positive output terminal of electricity controller 3 through respectively resistors 24 and 25.

Electricity controller 3 comprises a duty-ratio controller 27 and a current controller 28. Duty-ratio controller 27 supplies the output signals to base terminal of fourth transistor 23 in response to signals (first to third duty-ratio control signals)

applied to control input terminal 101 of electricity controller 3. Current controller 28 comprises a third transistor 19 which has a collector terminal connected to a positive terminal of DC power source 5 through switch 7 and an emitter terminal connected to a positive output terminal of inverter 4, and an amplifier 26 whose output terminal is connected to base terminal of third transistor 19 so that amplitude of output current or voltage from inverter 4 is controlled in response to input signals (first to third amplitude control signals) to a control input terminal 100 of amplifier 26.

When input signal of high voltage level is applied to control input terminal 100 of amplifier 26, electricity controller 3 produces the output voltage of increased amplitude to finally heighten amplitude in output voltage or current from inverter 4 to discharge tube 2. Adversely, when input signal of low voltage level is applied to control input terminal 100 of amplifier 26, electricity controller 3 produces the output voltage of decreased amplitude to finally lower amplitude in output voltage or current from inverter 4 to discharge tube 2. Thus, mean power or tube current to discharge tube 2 can be controlled during each period. On the contrary, typical and conventional systems comprise a detective resistor (not shown) for picking up level of tube current, and electricity controller 3 controls the output voltage in response to the detected current level. In this case, tube current can be controlled to a set value if potential level applied on detective resistor is regulated to the set value, however, this incurs energy loss through the detective resistor.

Meanwhile, when fourth transistor 23 is turned on by output signals from duty-ratio controller 27 to base terminal of fourth transistor 23, oscillation circuit 18 performs oscillation operation to supply AC power to discharge tube 2 during the first oscillation time span. Adversely, when fourth transistor 23 is turned off by output signals from duty-ratio controller 27 to base terminal of fourth transistor 23, oscillation circuit 18 ceases the oscillating action to provide a pause time span to stop AC power to discharge tube 2 while holding output voltage or tube current from inverter 4 at zero level during the second oscillation time span. Thus, duty-ratio controller 27 can provide an oscillation time span, or first oscillation time span and a pause time span, or second oscillation time span for differentiating power levels to discharge tube 2 between first and second oscillation time spans. In this way, duty-ratio controller 27 can work inverter 4 to adjust mean power or mean current to discharge tube 2 during each period by varying first oscillation time span or duty-ratio [(oscillation time)/(oscillation time plus pause time span)] or oscillation time with constant oscillation time plus pause time span while inverter 4 produces AC power to discharge tube 2.

FIG. 14 is a graph showing controlled output power or tube current from inverter 4. As voltage of lower level is applied to control terminal 100 of amplifier 26 during the second period, electricity controller 3 produces output voltage of lower level, thus, reducing amplitude of AC power or tube current from inverter 4. In this case, fourth transistor 23 is intermittently turned off at regular intervals by output signals from duty-ratio controller 27 during the second period to provide oscillation and pause time spans. With greater duty-ratio of oscillation time span or shorter pause time span, inverter 4 generates increased mean power or tube current during that time. For example, each duty-ratio for the first to third periods can be previously determined by control means such as timer circuits built-in electricity controller 3. Also, a typical duty frequency is set at hundreds hertz (Hz).

In the third embodiment of the instant invention, as shown in FIG. 15(a), electricity controller 3 repeats the oscillation time spans (first oscillation time spans) for causing inverter 4 to develop output power or tube current and the pause (or second oscillation) time spans for causing inverter 4 not to develop output power or tube current, while reiterating power wavelength inclusive of oscillation and pause time spans in a same cycle. Simultaneously, current controller 28 serves to gradually reduce output power from inverter 4 during the oscillation time spans to progressively decrease tube current level. As exemplified in FIG. 15(a), the time length of oscillation time span during the second period is extended by degrees, and at the same time, the time length of pause time span is shortened by degrees in other words with temporally increased duty-ratio as shown in FIG. 14.

More specifically, as understood from mean power of the third period shown by chain line in FIG. 15(a), the second mean power during the second period is lower than the first mean power during the first period and higher than the third mean power during the third period to prevent decrease in brightness of indicated screen on discharge tube upon after the first period. The pause time span in the third embodiment of the invention, means the second oscillation time span of lower or zero-level oscillation whose power level is lower than mean power level during the third period, and the example in FIG. 15(a) represents ceased or stopped power supply during the pause or second oscillation time span. Also, the power level during the first oscillation time span is designed to be higher than that during the third period.

In this case, oscillating power level at the initial stage of the first oscillation time span preferably nearly equals to oscillating power level at the end of the first period to smoothly shift the output power transition from the first to the second period. Similarly, oscillating power level at the end of the first oscillation time span preferably nearly equals to oscillating power level at the initial stage of the third period to smoothly shift the output power transition from the second to the third period. This provides the second period with buffering actions in smooth power gradation from higher mean power or current during the first period to lower mean power or current during the third period.

Figure 15:
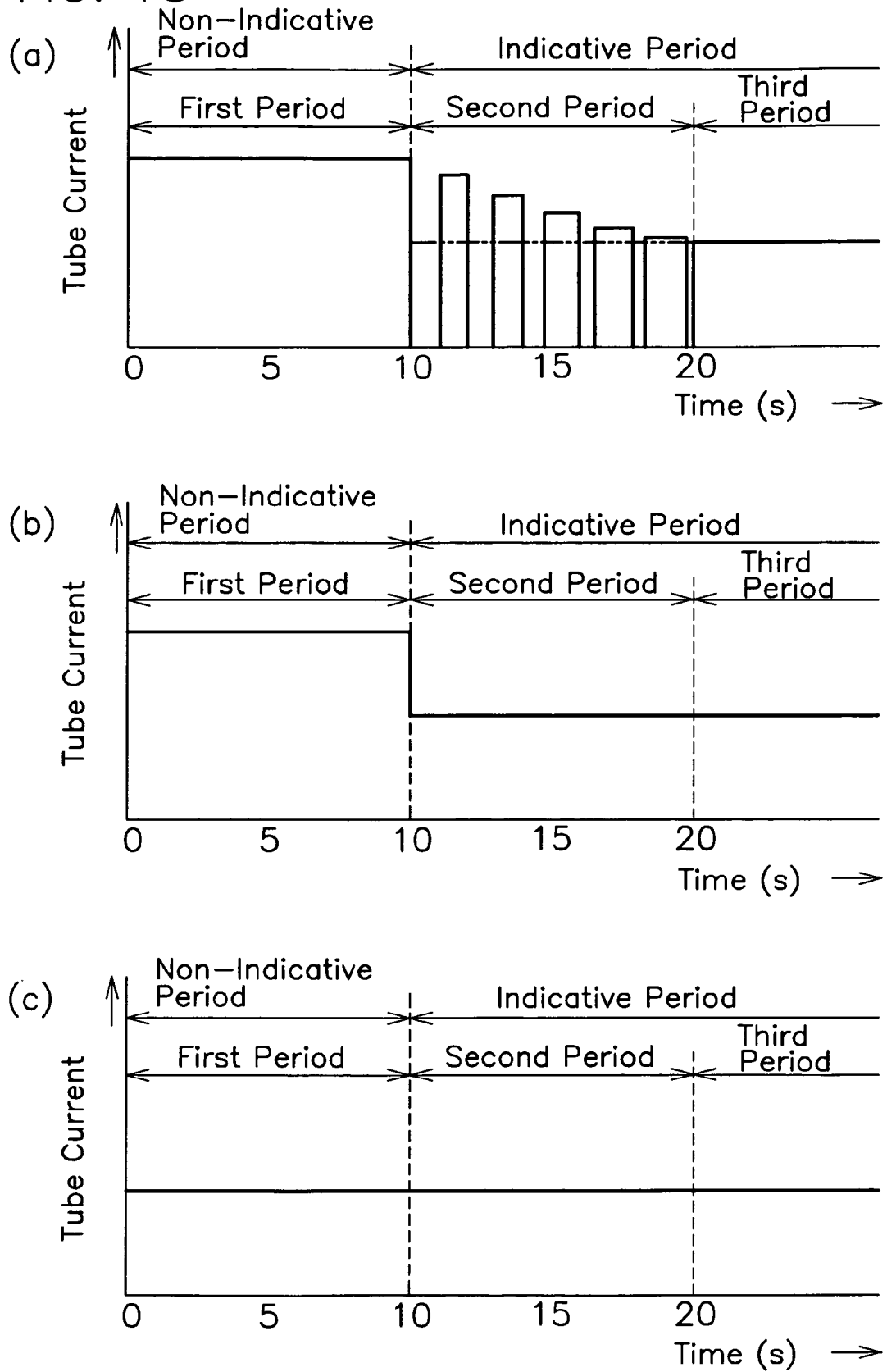
FIG. 15 is a graph showing temporal variation in levels of tube current of third, comparative and prior art examples.
Figure 16:
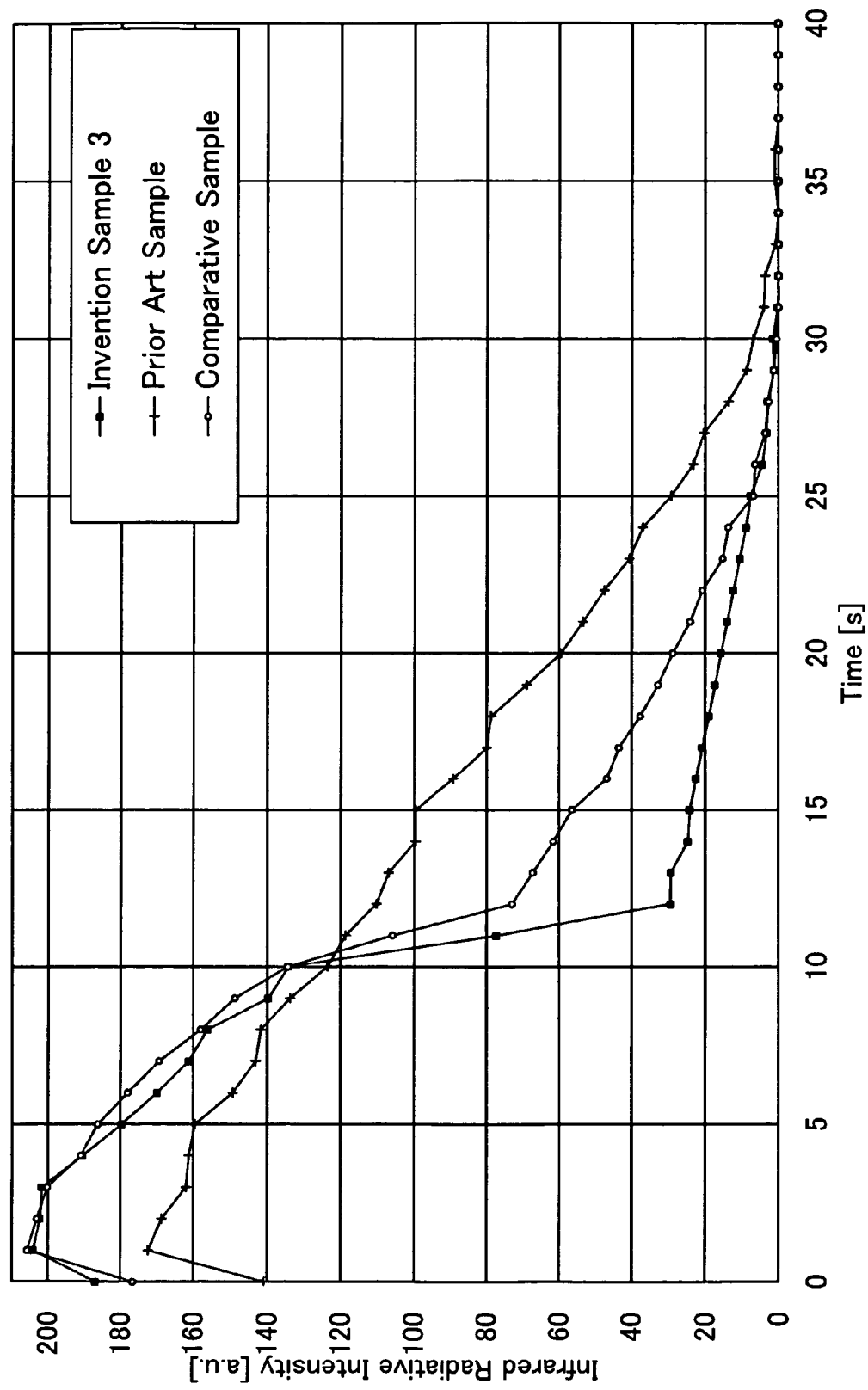
FIG. 16 a graph representing the infrared-inhibition effect in the third example.
Figure 17:
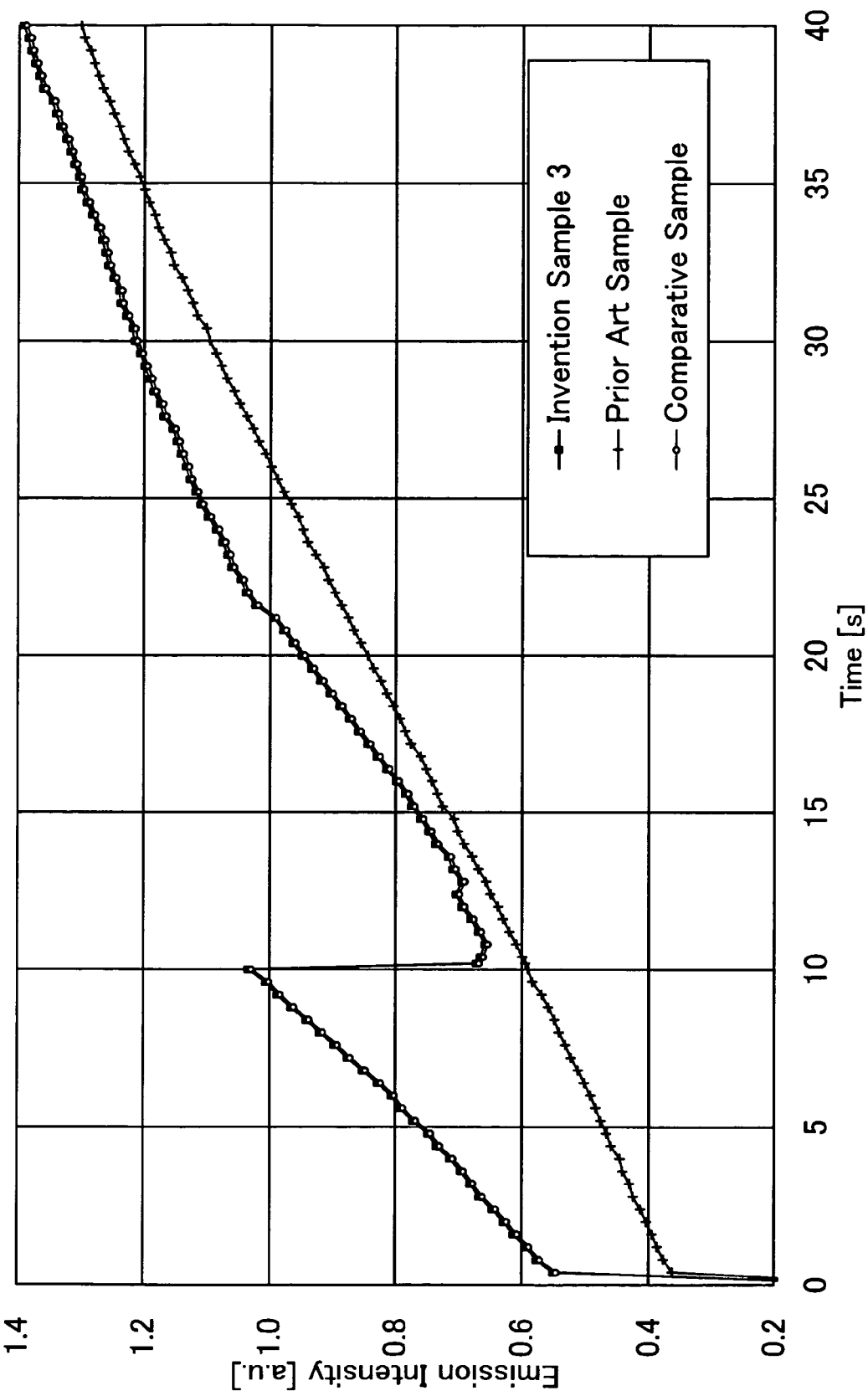
FIG. 17 is a graph showing the rising property in brightness in the third example.
Figure 18:
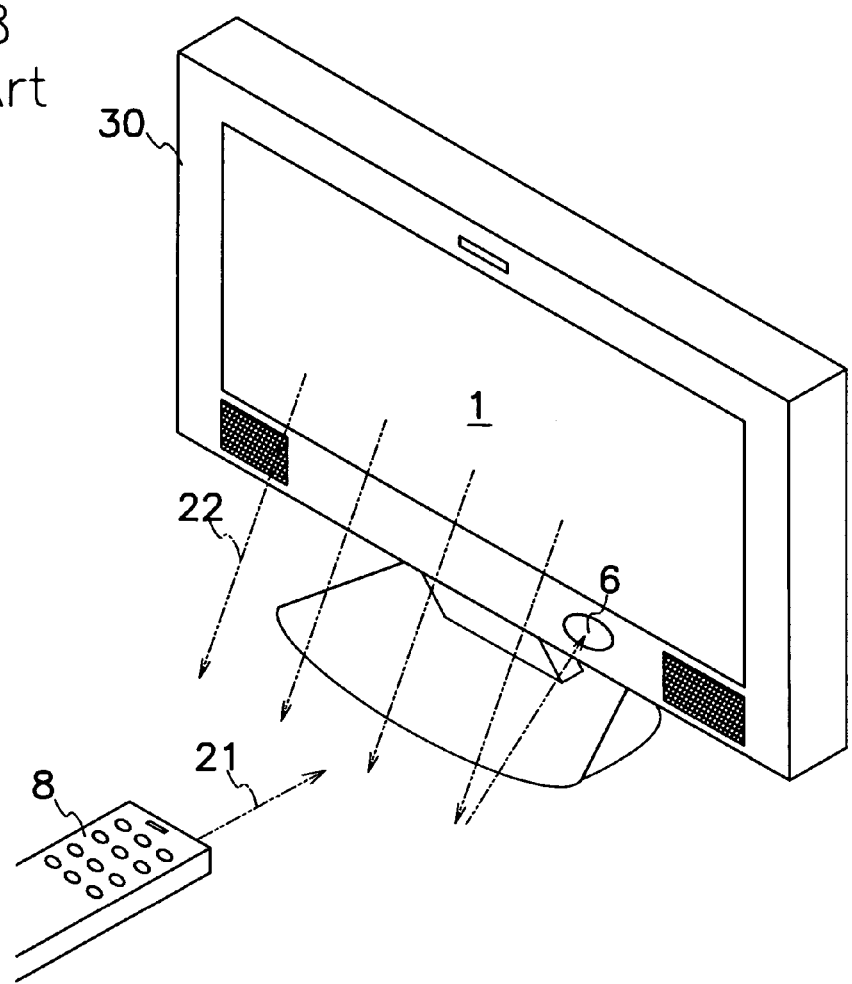
FIG. 18 is a perspective view indicating a prior art LCDTV and remote controller for switching screens of LCDTV.
Figure 19:
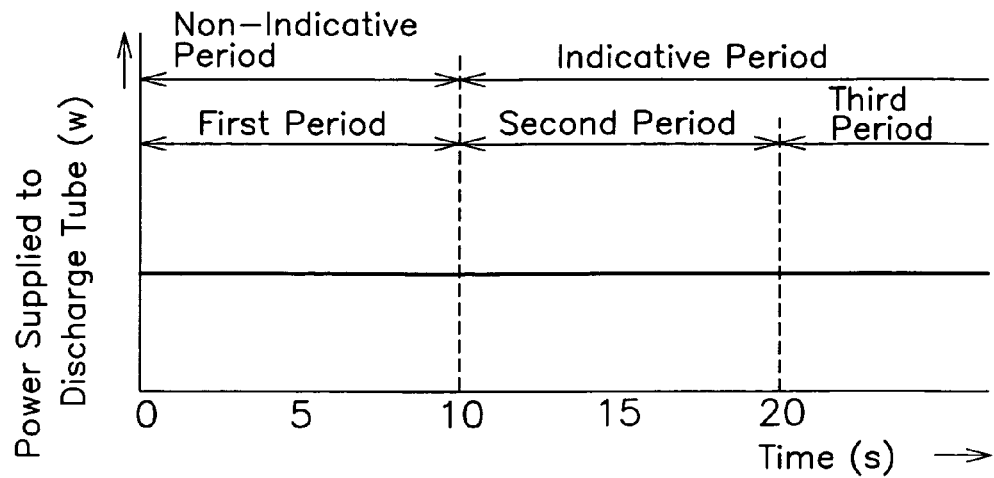
FIG. 19 is a graph showing a level of electric power supplied to discharge tube in a prior art device for lighting a discharge tube.

Each solid line shown in FIGS. 15(a), 15(b) and 15(c) denotes tube current levels respectively of Invention Sample according to lighting devices 10 of the third embodiment, Comparative and Prior Art Samples. Variations of electric power supplied to discharge tube 2 indicate similar waveforms to these current variations. FIG. 16 is a graph showing infrared radiant intensity respectively of Invention Sample 3 according to lighting devices 10 of the third embodiment, Comparative and Prior Art Samples. FIG. 17 is a graph showing leading property in brightness of display devices utilizing respectively of Invention Sample 3 according to lighting devices 10 of the third embodiment, Comparative and Prior Art Samples. FIGS. 15 to 17 all indicate variations with time course after turning-on of switch 7 with the first and second periods of respectively ten seconds. For lighting device 10 of the third embodiment, tube currents during the first and third periods were respectively 10.0 mArms and 5.0 mArms, and duty-ratio through the first and third periods was constant 100% to produce outputs from inverter 4. Tube current level during the second period was gradually lowered from 10.0 mArms to 5.0 mArms to control average tube current at 5.0 mArms during the second period. Simultaneously, duty-ratio during the second period was progressively increased from 50%. On the other hand, for the prior art lighting device, output power was produced from inverter 4 with tube current of 5.0 mArms from the first to third periods and at a constant 100% duty-ratio. Also, for the comparative lighting device, output power was generated from inverter 4 with tube current of 10.0 mArms during the first period, 5.0 mArms during the second and third periods and at a duty-ratio of constant 100% throughout the first, second and third periods.

As shown in FIG. 16, Invention Sample 3 of lighting devices 10 according to the third embodiment indicates the lowest infrared radiative intensity, and those of Comparative and Prior Art Samples have respectively their higher and highest infrared radiative intensity. Also, as shown in FIG. 17, lighting devices of Invention Sample 3 according to the third embodiment and Comparative Sample exhibit their improved, higher and steeply increasing leading or rise properties in brightness in comparison with that of Prior Art Sample, thus preventing declination in brightness on indicated screen on display device of the invention after the first period.

As mentioned above, lighting device 10 of the third embodiment supplies electric power of the same average level as that in Comparative Sample during the second period to give similar leading properties in brightness, while suppressing brightness drop on indicated screen after the first period. However, it should be noted that FIG. 16 exemplifies the significant and more reduction in infrared radiative amount of Invention Sample 3 according to the third embodiment of the present invention than that of Comparative Sample throughout the second period because Invention Sample 3 can effectively absorb infrared ray during the pause time intervals (the second oscillation time intervals) though discharge gas emits infrared ray during the first oscillation time spans of the second period.

The amount of the first power supplied to discharge tube 2 during the first period should have an optimal value to heat walls of discharge tube 2 and thereby produce an enough amount of mercury vapor to suppress release of infrared ray so that the amount of the first electricity can be experimentally selected. For example, larger amount of the first electricity furnished to discharge tube 2, can more increase the suppressive action by mercury vapor on emission of infrared ray during the second period. However, inconsistently, as excessive amount of the first electricity input to discharge tube 2 during the first period, causes service life of discharge tube 2 to shorten, and therefore, the supplied first electricity needs to be limited to an appropriate amount. Likewise, experimentally selectable are optimal value of the duty-ratio between the first and second oscillation time spans (oscillation and pause periods) and level of the second electricity to discharge tube 2 during the second period. The timing for switching the first to the second period could be set in anticipation, but otherwise, the first period may be switched to the second period in response to a signal output from detection means (not shown) for picking out electrical or other action induced upon completing setting-up operation of display 1. Also, in lieu of self-exciting oscillation circuit shown in FIG. 13, lighting device 10 may utilize a separately exciting oscillation circuit. For a same reason, means for ceasing oscillation of oscillation circuit 18 is not limited to one shown in FIG. 13.

In LCDTV according to the third embodiment of the present invention, infrared receiver 6 is immune to infrared ray released from discharge tube 2 if the relative radiative intensity of infrared ray is less than 60 a.u. As apparent from FIG. 16, display device of the third embodiment can fully reduce infrared radiative intensity below 60 a.u. within one to two seconds after completing setting-up operation of display 1 ten seconds after turning-on of switch 7. On the contrary, prior art display device continues to irradiate infrared ray from discharge tube 2 during the second period because electric power is successively supplied to discharge tube 2 with averaged and constant current of 5.0 mArms without pause of no or less current during the second period. Display device for Comparative Sample can more diminish radiative intensity of infrared ray than that of prior art display device. However, the former device disadvantageously cannot decrease radiative intensity of infrared ray below 60 a.u. at the initial stage of the second period so that inconveniently remote controller 8 cannot remotely operate display 1 through infrared ray for approximately five seconds after indicating screen. In that case, comparative display device can reduce radiative intensity of infrared ray during the second period with output current more lowered below 5.0 mArms, however, there would be produced an evil of more declination in brightness after the first period with reduction in mean electric power during the second period.

In this way, lighting device 10 of the third embodiment divides its operation during the second period into alternating first and second oscillation time spans to alternately produce by turns to discharge tube 2 power of first and second different levels respectively higher and lower than average power during the third period so that display device can be operated for switching of channels or the like by infrared ray from remote controller 8 from the time immediately after indicating screen on display 1. Prior art display device was inconveniently inhibited to change channels on screen by remote controller 8 for approximately ten seconds or for more than twenty seconds in cold weather, however, such inconvenience can be overcome by utilizing the electricity controller, lighting device and display device according to the present invention.

Embodiments of the present invention may be varied without limiting to those shown in FIGS. 13 to 17, and the invention can be carried out in still further embodiments so far as they are covered by the claims. Power level during the second oscillation time span during the second period would be preferable if it is on or below average power level during the third period, and therefore, the second oscillation time span does not necessarily need zero power level by pause or operation stop as mentioned regarding the third embodiment. Also, in place of switching from the first to the second period during the non-indicative period for display device of electricity controller, concurrent switching may be made from the non-indicative to the indicative periods for display device and from the first to the second periods.

In addition, to raise wall temperature of discharge tube 2 within a shorter time, mean power during the first period in the third embodiment may be selected with mean tube current of more than 10.0 mArms. Although this may be accompanied by shortened service life of discharge tube 2, average power during the first period may be settled at a high level with means tube current on the order of 15.0 mArms.

High power level would be desirable for the first oscillation time span during the second period, and therefore, may be above average power during the first period. Such a rise in power level during the first oscillation time span enables wall temperature of discharge tube 2 to go up within a shorter time. As a result, rapid elevation of wall temperature causes a large amount of mercury vapor to fill up in discharge tube 2 within shorter time to collide infrared ray emitted from discharge gas with mercury vapor for absorption of infrared ray by mercury vapor. In another aspect, a further infrared absorption effect may be attained by lowering power level during the second oscillation time span or extending the pause time span under the constant average power during the second period. Obviously, the present invention is not restricted by numeral value such as tube current or duty-ratio during the first to third periods. Moreover, delay time may be decided optionally, as required or appropriately for setting-up of display 1 in association with the first, second and third periods. Control period for output power from inverter 4 is not limited to the first, second and third periods, and may include the fourth or more periods. Pause or suspension time or times may preferably be provided in the first and/or third period. Pause or suspension times given in the first to third periods do not necessarily need the same time length, and they may independently be controlled.

For convenience of explanation, the foregoing indicates the electric power supplied to discharge tube as values of electric current flowing through discharge tube, assuming that tube voltage across discharge tube is constant if tube current is kept at a same level. Accordingly, the specification herein does not consider facts that tube voltage is high even with tube current of same level because of low temperature of tube wall at the initial stage of lighting discharge tube 2, that tube wall is heated to high temperature with time elapse, adversely with decrease in tube voltage and that tube voltage becomes stable with unchanged temperature of tube wall. Like the first and second embodiments, electricity controller 3 of the third embodiment is not restricted to LCDTV, and may be applied to other kind of display devices. The present invention is in particular applicable to display devices such as LCDTV having backlight source utilizing discharge tubes which emit infrared ray, and lighting devices and electricity controllers incorporated with such display devices.

What is claimed are:

1. An electricity controller for controlling output power from a power generator which supplies electric power to a discharge tube filled with discharge gas including argon and mercury,
   said electricity controller comprising a first power control means for controlling output power from said power generator to a first level during a first period of start-up time for feeding,
   a second power control means for controlling output power from said power generator to a second level lower than said first level during a second period after said first period, and
   a third power control means for controlling output power from said power generator to a third level greater than said second level and lower than said first level during a third period after said second period,
   wherein said power generator comprises an oscillator to control output power from said power generator by a duty ratio between oscillating and non-oscillating periods of said oscillator.

2. An electricity controller for controlling output power from a power generator which supplies electric power to a discharge tube filled with discharge gas including argon and mercury,
   said electricity controller comprising a first power control means for controlling output power from said power generator to a first level during a first period of start-up time for feeding,
   a second power control means for controlling output power from said power generator to a second level lower than said first level during a second period after said first period, and
   a third power control means for controlling output power from said power generator to a third level greater than said second level and lower than said first level during a third period after said second period,
   wherein said discharge tube emits infrared ray during said first and second periods, and
   an amount of infrared ray produced during said second period is less than that produced during said first period.

3. An electricity controller for controlling output power from a power generator which supplies electric power to a discharge tube filled with discharge gas including argon and mercury, said discharge tube being used as a light source for a display,
   said electricity controller comprising a first power control means for controlling output power from said power generator to a first level during a first period immediately after commencement of feeding electric power to said discharge tube, said first period including a non-indicative period of screen for said display,
   a second power control means for controlling output power from said power generator during a second period after said first period, said second period including a non-indicative period of screen for said display, and
   a third power control means for controlling output power from said power generator during a third period after said second period to supply a rated electric power to said discharge tube during said third period for displaying the screen of said display,
   wherein said second power control means repeatedly produces first and second oscillation time spans,
   each power level during the first oscillation time span is greater than mean power level during the third period, and
   each power level during the second oscillation time span is lower than mean power level during the third period.

4. The electricity controller of claim 3, wherein a cycle of output power from said power generator is constant throughout said first and second oscillation time spans in said second period,
   said second power control means gradually lowers the power level during said first oscillation time span, and simultaneously gradually reduces said second oscillation time span.

5. The electricity controller of claim 3, wherein mean power level during the first period is over the mean power level during the second period.

6. The electricity controller of claim 3, wherein means power level during the second period is over mean power level during the third period.

7. The electricity controller of claim 3, wherein said second power control means ceases supply of electric power to said discharge tube during said second oscillation time span.

8. The electricity controller of claim 3, wherein said third power control means controls output power from said power generator during the third period to maintain electric current through said discharge tube in a predetermined level.

9. The electricity controller of claim 3, wherein a power level during the first oscillation time span is over mean power level during said first period.

10. A lighting device comprising:
    a discharge tube filled with discharge gas including argon and mercury for use in a light source for a display, and
    an electricity controller for controlling output power from a power generator which supplies electric power to said discharge tube,
    said electricity controller comprising: a first power control means for controlling output power from said power generator during a first period immediately after commencement of feeding electric power to said discharge tube, said first period including a non-indicative period of screen for said display,
    a second power control means for controlling output power from said power generator during a second period after said first period, said second period including a non-indicative period of screen for said display, and a third power control means for controlling output power from said power generator during a third period after said second period to supply a rated electric power to said discharge tube during said third period for displaying the screen of said display, wherein said second power control means repeatedly produces first and second oscillation time spans, each power level during the first oscillation time span is greater than mean power level during the third period, and each power level during the second oscillation time span is lower than mean power level during the third period.

11. A display device comprising:
a display,
a discharge tube filled with discharge gas including argon and mercury, said discharge tube being used as a light source for said display,
a power generator for supplying electric power to said discharge tube, and
an electricity controller for controlling output power from said power generator,
said electricity controller comprising a first power control means for controlling output power from said power generator during a first period immediately after commencement of feeding electric power to said discharge tube, said first period including a non-indicative period of screen for said display,
a second power control means for controlling output power from said power generator during a second period after said first period, said second period including a non-indicative period of screen for said display, and
a third power control means for controlling output power from said power generator during a third period after said second period to supply a rated electric power to said discharge tube during said third period for displaying the screen of said display,
wherein said second power control means repeatedly produces first and second oscillation time spans,
each power level during the first oscillation time span is greater than mean power level during the third period, and
each power level during the second oscillation time span is lower than mean power level during the third period.

12. The display device of claim 11, further comprising an infrared receiver for receiving control signals from a remote controller.

13. A method for controlling electric power from a power generator to a discharge tube filled with discharge gas including argon and mercury, said method comprising the steps of:
firstly controlling output power from said power generator to a first level during a first period of start-up time for feeding to said discharge tube,
secondly controlling output power from said power generator to a second level lower than the first level during a second period after said first period, and
thirdly controlling output power from said power generator to a third level greater than the second level but smaller than the first level during a third period after the second period,
wherein said power generator supplies an enough amount of electric power to said discharge tube during the first period to generate a sufficient amount of mercury vapor in said discharge tube so that the mercury vapor absorbs infrared ray emitted from the discharge gas within said discharge tube during the second period in order to reduce the amount of infrared ray irradiated from said discharge tube.

14. The method of claim 13, wherein a first value of electric current flowing through said discharge tube during the first period is settled to a level in a range between 9.0 mArms and 15.0 mArms; a second value of the electric current to said discharge tube during the second period is settled to a level below the first value or of zero or to combined levels below the first value and of zero; and a third value of the electric current to said discharge tube during the third period is settled to a level of the second value or above the second value and below the first value.

15. A method for controlling electric power to a discharge tube filled with discharge gas including argon and mercury, said method comprising the steps of:
firstly controlling electric power supplied to said discharge tube to a first level during a first period immediately after commencement of feeding electricity to said discharge tube used as a light source of a display, said first period including a non-indicative period of screen on said display,
secondly controlling electric power supplied to said discharge tube to a second level lower than the first level during a second period including an indicative period of screen on said display after said first period, and
thirdly controlling electric power supplied to said discharge tube to a third level of a rated electric power during a third period after the second period,
wherein said second period comprises a first oscillation time span for supplying to said discharge tube electric power of the second level greater than an average level during the third period, and a second oscillation time span for supplying to said discharge tube electric power of the second level lower than an average level during the third period, and
said first and second oscillation time spans are alternately produced during the second period.

16. The method of claim 15, wherein said second period comprises a constant cycle of continuous one first and one second oscillation time spans; and
electric power level of said first oscillation time span is gradually lowered during the second period while simultaneously said second oscillation time span is gradually shortened.

* * * * *

UNITED STATES PATENT AND TRADEMARK OFFICE
CERTIFICATE OF CORRECTION

PATENT NO. : 7,605,548 B2
APPLICATION NO. : 11/526985
DATED : October 20, 2009
INVENTOR(S) : Yamashita et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 404 days.

Signed and Sealed this

Fifth Day of October, 2010

David J. Kappos
*Director of the United States Patent and Trademark Office*